US012664131B2

(12) United States Patent (10) Patent No.: US 12,664,131 B2
Cooper et al. (45) Date of Patent: Jun. 23, 2026

(54) SYSTEM AND METHOD FOR DATA SCIENCE MODEL SCORING

(71) Applicant: HARTFORD FIRE INSURANCE COMPANY, Hartford, CT (US)

(72) Inventors: William L. Cooper, Port St Joe, FL (US); Scott Andrew Steinkirchner, Leesburg, VA (US); Arthur Paul Drennan, III, Avon, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 179 days.

(21) Appl. No.: 17/944,382

(22) Filed: Sep. 14, 2022

(65) Prior Publication Data

US 2024/0086377 A1     Mar. 14, 2024

(51) Int. Cl.
*G06F 16/21*          (2019.01)
(52) U.S. Cl.
CPC .................................. *G06F 16/212* (2019.01)
(58) Field of Classification Search
CPC ...................................................... G06F 16/212
See application file for complete search history.

(56) References Cited

U.S. PATENT DOCUMENTS

| | | | |
|---|---|---|---|
| 6,920,458 | B1 | 7/2005 | Chu et al. |
| 7,240,213 | B1 | 7/2007 | Ritter |
| 7,281,045 | B2 | 10/2007 | Aggarwal et al. |
| 7,924,874 | B2 | 4/2011 | Powers et al. |

| | | | | |
|---|---|---|---|---|
| 8,195,709 | B2 | 6/2012 | Pulfer | |
| 8,990,145 | B2 | 3/2015 | Lingenfelder et al. | |
| 9,529,629 | B2 | 12/2016 | Moloian et al. | |
| 2004/0179528 | A1 | 9/2004 | Powers et al. | |
| 2014/0279747 | A1* | 9/2014 | Strassner | .............. H04L 41/085 706/12 |
| 2017/0357029 | A1* | 12/2017 | Lakshmanan | .......... G06Q 10/04 |
| 2018/0018602 | A1* | 1/2018 | DiMaggio | .............. G16H 10/60 |
| 2018/0225600 | A1* | 8/2018 | Govindugari | ........ G06Q 10/063 |
| 2019/0096016 | A1* | 3/2019 | Rowan | .............. G06Q 50/2057 |
| 2022/0101339 | A1 | 3/2022 | Carter | |
| 2022/0376888 | A1* | 11/2022 | Sarpatwar | ............. H04L 9/0894 |
| 2022/0398341 | A1* | 12/2022 | Diaz-Mitoma | ..... G06F 21/6245 |
| 2023/0289619 | A1* | 9/2023 | Hodos | .................... G06N 20/00 |
| 2024/0362541 | A1* | 10/2024 | Muller | ................ G06F 18/2113 |

\* cited by examiner

*Primary Examiner* — Christopher J Raab
(74) *Attorney, Agent, or Firm* — Buckley, Maschoff & Talwalkar LLC

(57) ABSTRACT

A data science model score database may contain electronic records, each including a data science model identifier and a set of data science model scores. A data science model score server, coupled to the data science model score database, may receive (from a remote user device) an indication of a selected data science model. The server may then retrieve, from the data science score database, information about the selected data science model. Based on the retrieved information, the server may automatically calculate a maturity score for the selected data science model in accordance with a scalable score, a service-oriented score, a validated score, and a productized score. When the server receives from the remote user device an adjustment to at least one of the scalable score, the service-oriented score, the validated score, and the productized score, it may automatically re-calculate the maturity score for the selected data science model.

14 Claims, 25 Drawing Sheets

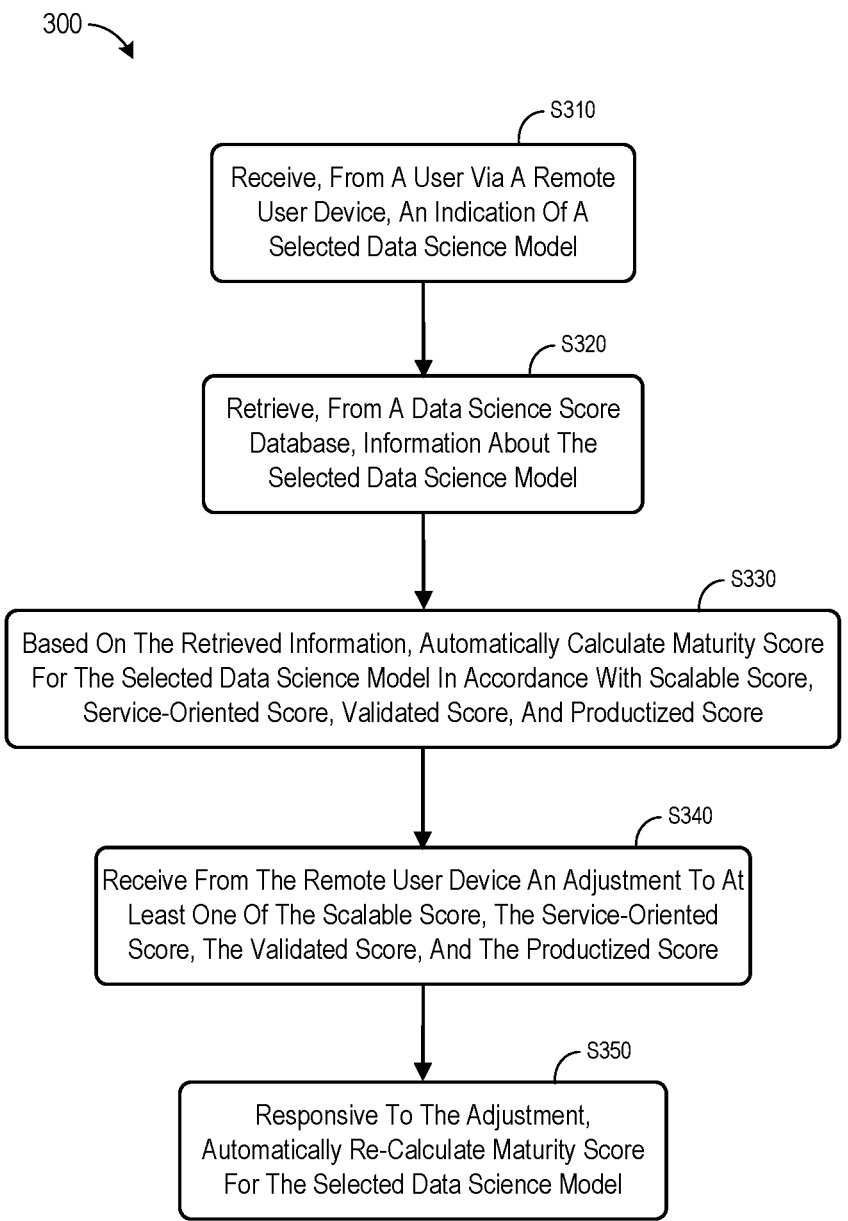

300

S310

Receive, From A User Via A Remote
User Device, An Indication Of A
Selected Data Science Model

S320

Retrieve, From A Data Science Score
Database, Information About The
Selected Data Science Model

S330

Based On The Retrieved Information, Automatically Calculate Maturity Score
For The Selected Data Science Model In Accordance With Scalable Score,
Service-Oriented Score, Validated Score, And Productized Score

S340

Receive From The Remote User Device An Adjustment To At
Least One Of The Scalable Score, The Service-Oriented
Score, The Validated Score, And The Productized Score

S350

Responsive To The Adjustment,
Automatically Re-Calculate Maturity Score
For The Selected Data Science Model

QUARTERLY SCORES

Reporting - Overall Model Statistical Page

Overall Site Performance By Individual Model

| Model Name | Current Score | 2023-Q1 | 2023-Q2 | % Change |
|---|---|---|---|---|
| ☐ | | | | |
| ☐ Data Science Model One | 1.5 | 1.5 | 1.5 | 0% |
| ☐ Data Science Model Two | 1.0 | 1.0 | 2.0 | 100% |
| ☐ Data Science Model Three | 3.0 | 4.0 | 3.0 | -25% |
| ☐ Data Science Model Four | 2.4 | 2.4 | 2.4 | 0% |

1900

| SCORED ITEM | INTENT | DEFINITION | IDEAL |
|---|---|---|---|
| Build/Release Notes | Communication Change Management | Consistent and on-brand notes regarding releases and updates to advise business customers and team as to changes made to model. Notes should accompany model changes in a timely fashion, *e.g.* notes should be released when model changes go into production. | • Consistent with brand<br><br>• Released timely (in advance of or within two weeks of an updated service going into production) |

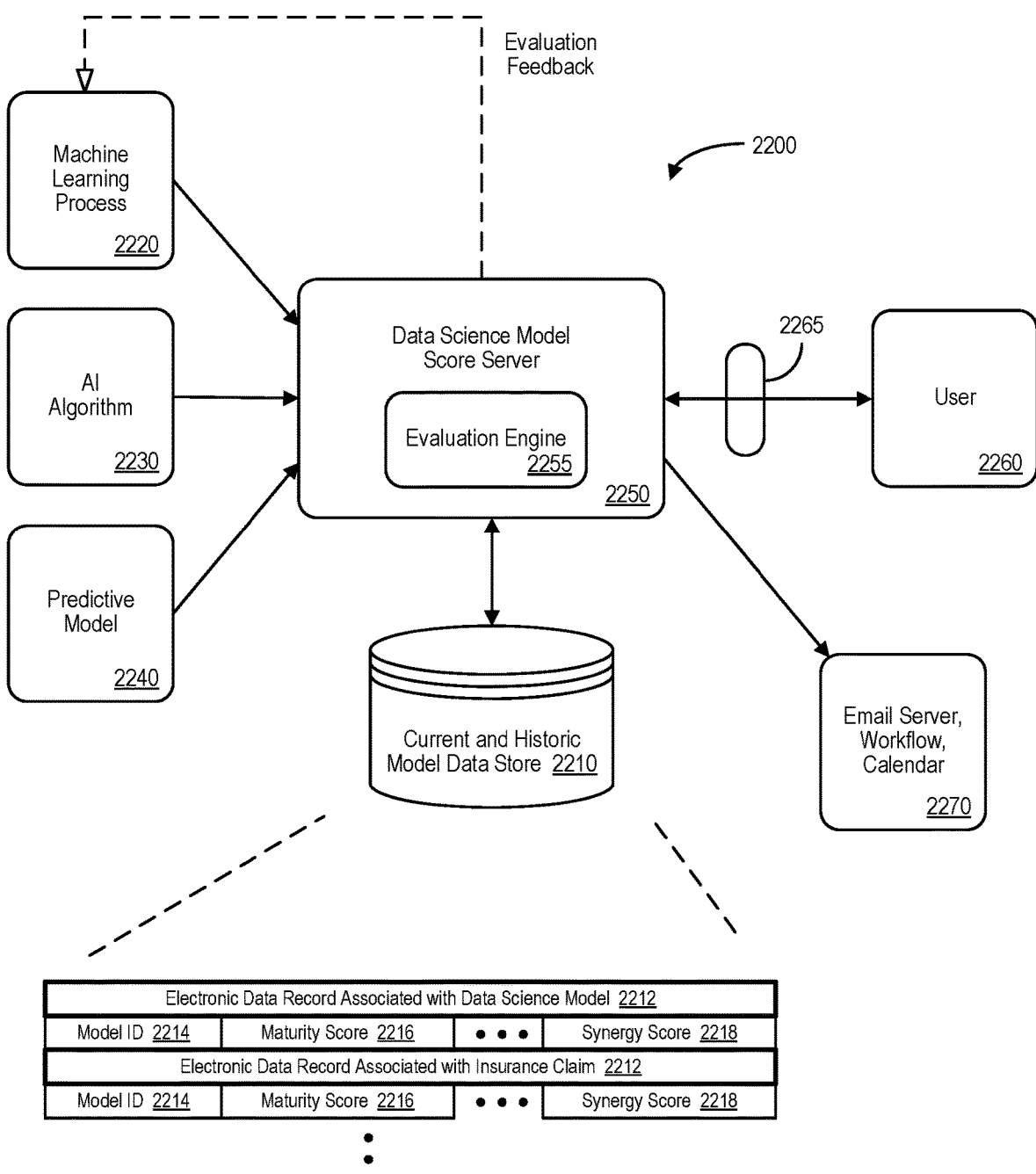

Evaluation
Feedback

2200

Machine
Learning
Process

2220

AI
Algorithm

2230

Predictive
Model

2240

Data Science Model
Score Server

Evaluation Engine
2255

2250

2265

User

2260

Current and Historic
Model Data Store  2210

Email Server,
Workflow,
Calendar

2270

| Electronic Data Record Associated with Data Science Model  2212 | | | |
|---|---|---|---|
| Model ID  2214 | Maturity Score  2216 | • • • | Synergy Score  2218 |
| Electronic Data Record Associated with Insurance Claim  2212 | | | |
| Model ID  2214 | Maturity Score  2216 | • • • | Synergy Score  2218 |

*FIG. 22*

| DATA SCIENCE MODEL ID 2402 | MODEL NAME 2404 | MATURITY SCORE 2406 | DETAILED MATURITY CATEGORY SCORES 2408 | HISTORICAL QUARTERLY SCORES 2410 |
|---|---|---|---|---|
| DS_101 | DATA SCIENCE MODEL ONE | 1.7 | | |
| DS_102 | DATA SCIENCE MODEL TWO | 2.5 | | |
| DS_103 | DATA SCIENCE MODEL THREE | 0.9 | | |
| DS_104 | DATA SCIENCE MODEL FOUR | 1.1 | | |

SYSTEM AND METHOD FOR DATA SCIENCE MODEL SCORING

BACKGROUND

In some cases, an enterprise may use data science models to perform business functions. As used herein, the phrase "data science model" may refer to methods, processes, algorithms, and systems that extract knowledge and insights from structured and unstructured data. A data science model might be related to data mining, machine learning, big data, etc. For example, a business, such as an insurance company, might use a data science model to evaluate characteristics of insurance claims.

With the continuing growing portfolio of data science models (e.g., predictive models, solutions and assets) in production—and others in various states of development at any point in time—it can be difficult to ensure that each model is current and performing as intended. This problem is further compounded by several factors, such as:

There are many different types of models or solutions as defined by the algorithms that are utilized, the platform on which each is built, and/or or the way in which results are shared with end customers in addition to a myriad of other complications.

The teams responsible to ensure that productionized models remain current are also under pressure to create and productionize new solutions for business problems.

There are a number of ways to potentially address these problems, such as solution validations or "health checks," monitoring and maintenance solutions, and other means. However, most of those rely on additional teams and resources to perform the work and are sometimes difficult to scale to the appropriate level—especially when an enterprise is monitoring a substantial number of data science models (e.g., hundreds of complex data science models across various lines of business).

Systems and methods for improvements in processes relating to the management of data science models, including data science model scoring, while avoiding unnecessary burdens on computer processing resource utilization, would be desirable.

SUMMARY OF THE INVENTION

According to some embodiments, systems, methods, apparatus, computer program code and means may provide ways to facilitate the management of data science models. A data science model score database may contain electronic records, each including a data science model identifier and a set of data science model scores. A data science model score server, coupled to the data science model score database, may receive (from a remote user device) an indication of a selected data science model. The server may then retrieve, from the data science score database, information about the selected data science model. Based on the retrieved information, the server may automatically calculate a maturity score for the selected data science model in accordance with a scalable score, a service-oriented score, a validated score, and a productized score. When the server receives from the remote user device an adjustment to at least one of the scalable score, the service-oriented score, the validated score, and the productized score, it may automatically re-calculate the maturity score for the selected data science model.

Some embodiments provide means for receiving, at a computer processor of a data science model score server from a user via a remote user device, an indication of a selected data science model; means for retrieving, from a data science score database, information about the selected data science model, wherein the data science model score database contains electronic records, each record including a data science model identifier and a set of data science model scores generated for the enterprise; based on the retrieved information, means for automatically calculating a maturity score for the selected data science model in accordance with a scalable score, a service-oriented score, a validated score, and a productized score; means for receiving from the remote user device an adjustment to at least one of the scalable score, the service-oriented score, the validated score, and the productized score; and, responsive to the adjustment, means for automatically re-calculating the maturity score for the selected data science model.

A technical effect of some embodiments of the invention is an improved and computerized method of managing and scoring data science models for an enterprise. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3 illustrates a method according to some embodiments of the present invention.

FIG. 19 is an example of a definition table in accordance with some embodiments of the present invention.

FIG. 22 is a more detailed system architecture according to some embodiments of the present invention.

FIG. 24 is a tabular portion of a data science model database according to some embodiments.

DESCRIPTION

Figure 1:
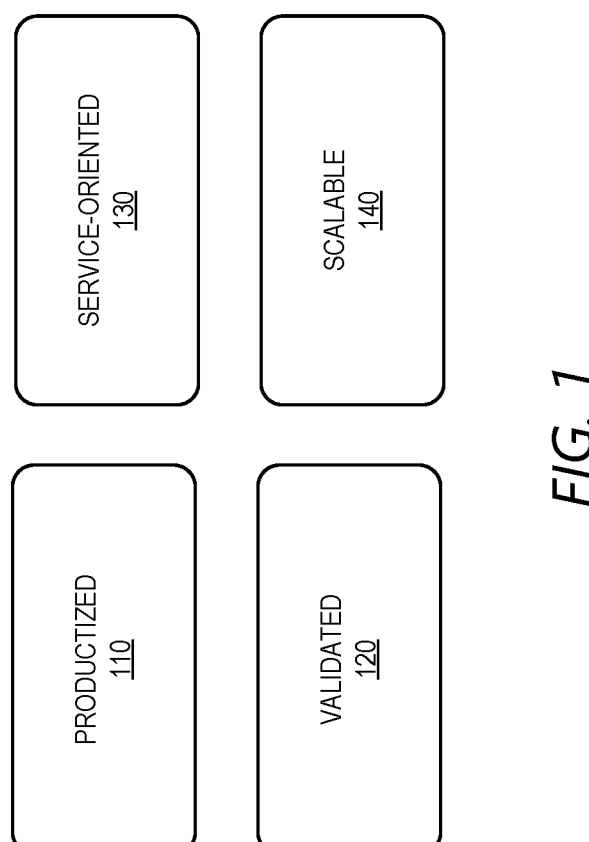
FIG. 1 shows some attributes of a data science model according to some embodiments of the present invention.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data availability, consistency, and analytics associated with data science models. The present invention is directed to more than merely a computer implementation of a routine or conventional activity previously known in the industry as it provides a specific advancement in the area of electronic record availability, consistency, and analysis by providing improvements in the operation of a computer system that uses machine learning and/or predictive models to ensure data quality. The present invention provides improvement beyond a mere generic computer implementation as it involves the novel ordered combination of system elements and processes to provide improvements in the speed at which such data can be made available and consistent results. Some embodiments of the present invention are directed to a system adapted to automatically validate information, analyze electronic records, aggregate data from multiple sources including text mining, determine appropriate model scores, etc. Moreover, communication links and messages may be automatically established (e.g., to provide data science model reports and alerts), aggregated, formatted, exchanged, etc. to improve network performance (e.g., by reducing an amount of network messaging bandwidth and/or storage required to support data science model score collection, analysis, and distribution).

Some embodiments described herein provide a data science model management tool to simultaneously compare each model against other models and/or an ideal model. Embodiments may let managers have a snapshot view of their respective model portfolios such that they can make resourcing decisions about to how best to keep their suites up-to-date and aligned with organizational, departmental, and/or team goals. In this way, embodiments may let a data science team understand at any point in time how each service or solution within an overall suite compares to other models and/or an ideal model. The capability may include:

A web-based application that provides users with an interface through which they can interact and update information pertaining to their assigned services or solutions.

A rubric that enables the scoring of different items (e.g., on a gradient of zero to four with four being the highest potential score). In some embodiments, the rubric's various line items may be grouped into one of four potential categories. Moreover, the rubric may be expandable to allow for an incorporation of other, non-model assets into the framework.

A process through which all scores are reviewed quarterly with an emphasis on how scores have changed from one quarter to the next and on gaining and reviewing what else can be done to increase the score of each asset, thereby increasing the currency and organizational alignment for not only the individual asset but also the entire solutions suite.

Some embodiments may establish a baseline score for a suite of data science models, and for each model with the suite, from which directional movement can be measured. Four main traits that may epitomize an ideal data science model might be utilized to manage and the suites and models. FIG. 1 shows attributes 100 of a data science model according to some embodiments of the present invention. In particular, a data science model might be scored in connection to the extent it is: productized 110, validated 120, service-oriented 130, and/or scalable 140. These traits are described in more detail in connection with FIG. 4.

Figure 2:
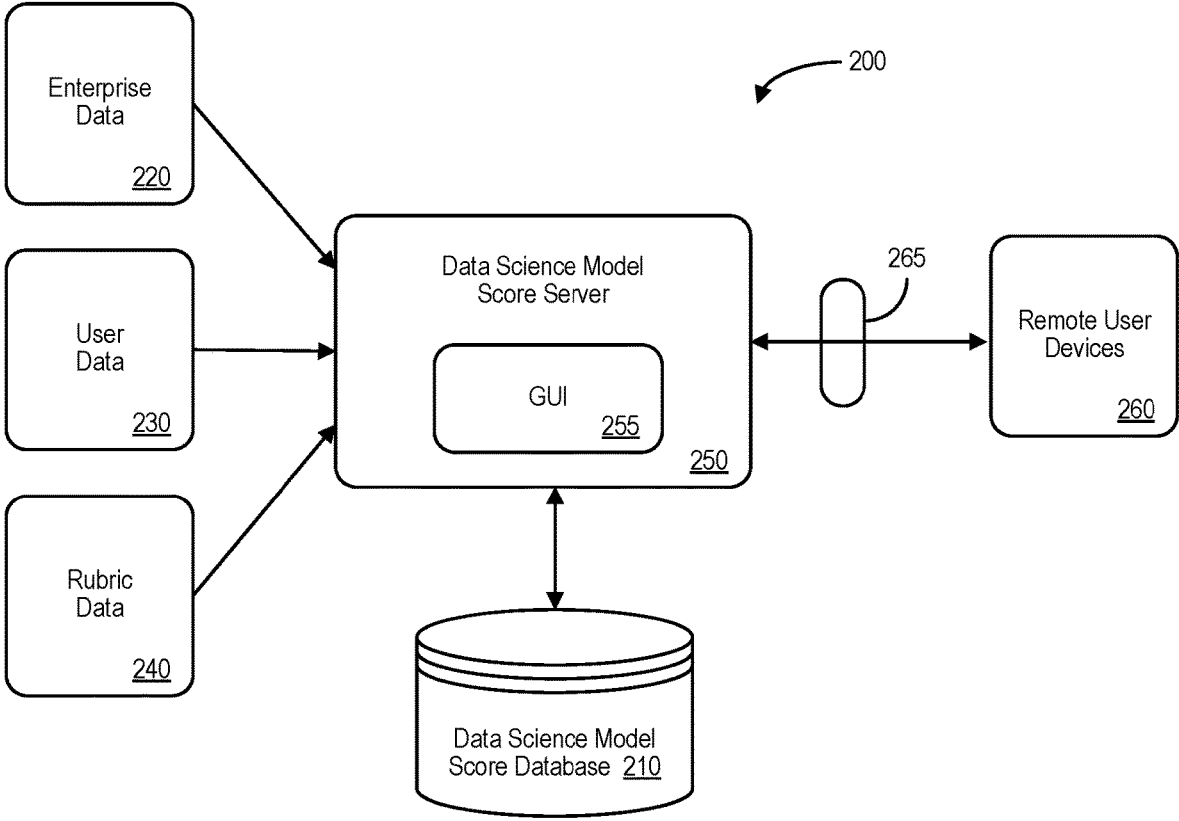
FIG. 2 is block diagram of a system in accordance with to some embodiments of the present invention.

FIG. 2 is a high-level block diagram of a system 200 according to some embodiments of the present invention. In particular, the system 200 includes a data science model score server 250 that may access information in a data science model score database 210 (e.g., storing a set of electronic records representing model scores, each record including, for example, one or more model identifiers and a set of scores generates for an enterprise, etc.). The data science model score server 250 may also retrieve information from other data stores or sources (e.g., enterprise data 220 about a business or organizational structure or hierarchy, user data 230 to provide security so that only authorized users have access to views or modify scores, and rubric data 240 defining how models should be evaluated) in connection with a Graphical User Interface ("GUI") 255 and apply machine learning or artificial intelligence algorithms and/or models to the electronic records. The data science model score server 250 may also exchange information with remote user devices 260 (e.g., via communication port 265 that might include a firewall). According to some embodiments, GUI 255 of the data science model score server 250 may facilitate the display of information associated with the model scores via one or more remote computers (e.g., to enable a manual review of a model score, establish a communication link with a data science team or model owner, and/or initiate an automatically selected workflow) and/or the remote user devices 260 (e.g., associated with a data scientist). For example, the remote user devices 260 may receive updated information (e.g., new model information) from the data science model score server 250. Based on the updated information, a user may review the data from the data science model score database 210 and make informed decisions about model management. Note that the data science model score server 250 and/or any of the other devices and methods described herein might be associated with a cloud-based environment and/or a third-party, such as a vendor that performs a service for an enterprise.

The data science model score server 250 and/or the other elements of the system 200 might be, for example, associated with a Personal Computer ("PC"), laptop computer, smartphone, an enterprise server, a server farm, and/or a database or similar storage devices. According to some embodiments, an "automated" data science model score server 250 (and/or other elements of the system 200) may facilitate updates of electronic records in the data science model score database 210. As used herein, the term "automated" may refer to, for example, actions that can be performed with little (or no) intervention by a human.

As used herein, devices, including those associated with the data science model score server 250 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data science model score server 250 may store information into and/or retrieve information from the data science model score database 210. The data science model score database 210 might, for example, store electronic records representing a plurality of predictive models, each electronic record having a model identifier and set of model scores. The data science model score database 210 may also contain information about prior and current interactions with entities, including those associated with the remote devices 260. The data science model score database 210 may be locally stored or reside remote from the data science model score server 250. As will be described further below, the data science model score database 210 may be used by the data science model score server 250 in connection with an interactive user interface to provide information about model management. Although a single data science model score server 250 is shown in FIG. 2, any number of such devices may be included. Moreover, various devices described herein might be combined according to embodiments of the present invention. For example, in some embodiments, the data science model score server 250 and the data science model score database 210 might be co-located and/or may comprise a single apparatus.

FIG. 3 illustrates a method that might be performed, for example, by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a data science model score server may receive, from a user via a remote user device, an indication of a selected data science model. At S320, the system may retrieve, from a data science score database, information about the selected data science model. The data science model score database may, for example, contain electronic records, each record including a data science model identifier and a set of data science model scores generated for an enterprise. According to some embodiments, at least some scores are associated with user-selectable rubric item options in a drop-down menu.

Based on the retrieved information, at S330 the system may automatically calculate a maturity score for the selected data science model in accordance with a scalable score, a service-oriented score, a validated score, and a productized score. The scalable score may, for example, include information about, for the selected data science model, at least one of: monitored model data and automated model data. The service-oriented score may, for example, include information about: standardized model data, aligned model data, and/or cloud-based model data. The validated score may, for example, include information about: audit validated model data, updated model data, and/or reviewed model data. The productized score may, for example, include information about: documented model data, impacting model data, accessible knowledge-based model data, and/or marketed and communicated model data.

According to some embodiments, the data science model score server is further to automatically calculate a "synergy score" for the selected data science model. As used herein, the phrase "synergy score" may refer to a measurement that determines if seemingly disparate Machine Learning ("ML") and Artificial Intelligence ("AI") predictive model solutions are similar to one another. Solution similarity, when found, may let an organization consider whether one solution might serve multiple use cases or if the two solutions can be combined into one (thus letting the enterprise reduce the total number of solutions that are monitored and maintained). A synergy score may be determined by comparing some aspects of metadata stored in the model inventory. Part of this comparison might utilize Natural Language Processing ("NLP") text analysis to determine if there are similarities in the business opportunity targeted and the scope of the solutions. This information may then be combined with other weighted aspects of the solution, like platform and target, to provide an overall synergy score.

At S340, the system may receive from the remote user device an adjustment to at least one of the scalable score, the service-oriented score, the validated score, and the productized score. Responsive to the adjustment, at S350 the system may automatically re-calculate the maturity score for the selected data science model. According to some embodiments, a graphical interactive user interface display includes a reporting dashboard (e.g., including a polar coordinate graph of current data science model scores and/or historical data science model scores).

Figure 4:
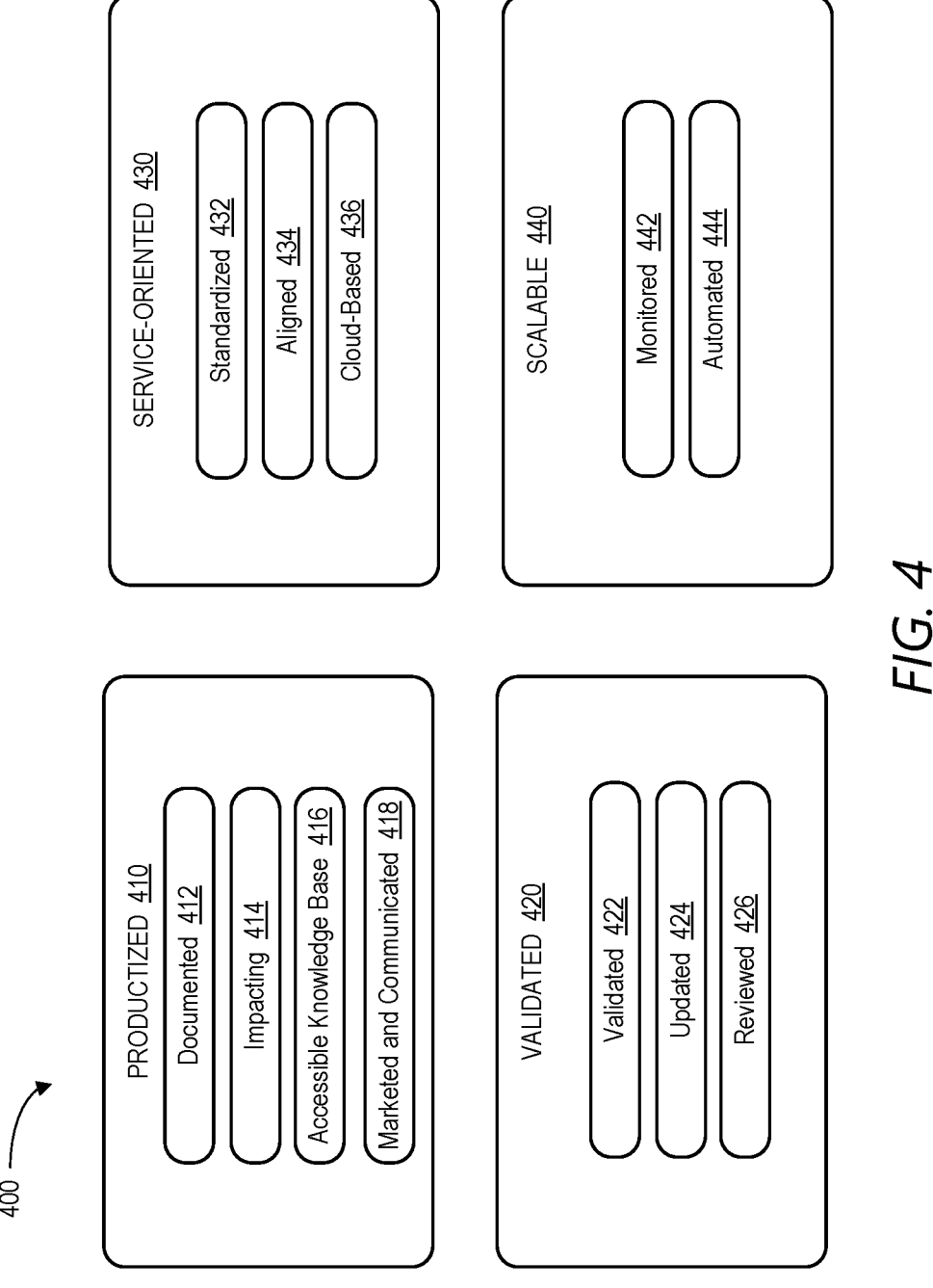
FIG. 4 illustrates some measurable attributes of an ideal model according to some embodiments of the present invention.

In some cases, key attributes of a mature model (such as model performance) can't be easily evaluated by a snapshot-in-time review and, as a result, other attributes may be used as a proxy. FIG. 4 illustrates some measurable attributes 400 of an ideal model according to some embodiments of the present invention. With respect to a productized 410 quality of a model, the system may consider an extent to which the model is documented 412. Documentation may be required for maturity because it helps for audit purposes and to ensure continuity. Documentation may also enable the concept of "any qualified operator" and product standardization. The system may also consider an impacting 414 value (models and assets should be solutions and, as such, should impact the business in some measurable way), an accessible knowledge base 416 value (a knowledge base lets other data science team members learn from the model or asset and helps potential customers gain understanding), and a marketed and communicated 418 value (models and assets are essentially business products and the benefits associated with them should be broadcast across an organization to increase utility).

With respect to a validated 420 quality of a model, the system may consider an extent to which the model is validated 422. Validation may help for audit purposes and serve to ensure that the model is performing adequately. Recurring validation indicates a mature process. The system may also consider an updated 424 value (ensuring models and assets are updated on regular and recurring basis promotes security, helps understand if customer guarantees are being met, and allows for new innovation), a reviewed 426 value (regularly reviewing a model or asset with a customer is indicative of a mature process and helps promote the benefit and impact of the product while ensuring that the guarantees given to the customer are being met).

With respect to a service-oriented 430 quality of a model, the system may consider an extent to which the model is standardized 432. Standardized models fit more readily and easily into an automated and supported structure and enable additional capabilities. Additionally, standardized assets typically offer more stability. The system may also consider an aligned 434 value. When an organization moves toward more of a service orientation (e.g., migrating to the cloud, Development and Operations ("DevOps"), etc.) it may benefit from aligned and mature models. The system may also consider a cloud-based 436 value (cloud-based models and assets are more mature in that they are likely to be more efficient in terms of cost-benefit and be rapidly scaled).

With respect to a scalable 440 quality of a model, the system may consider an extent to which the model is monitored 442. Having models monitored by a production support group enables scale because it frees up capacity to continue with innovation. The system may also consider an automated 444 value (automating the execution and ability to monitor a model enables scale because it frees up capacity to continue with innovation).

Figure 5:
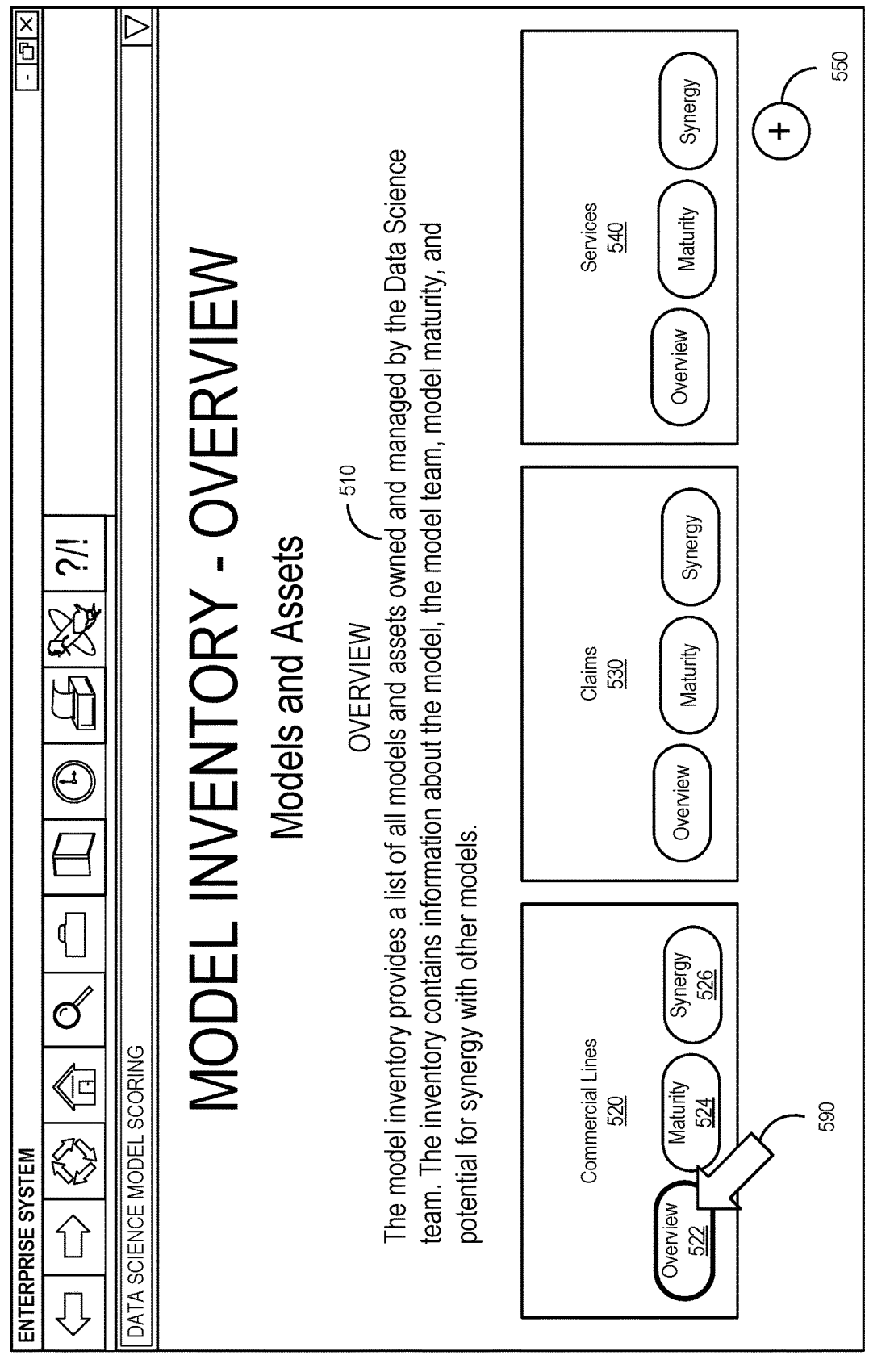
FIG. 5 is a model inventory overview display in accordance with some embodiments of the present invention.

According to some embodiments, a model management system may be accessed through a model inventory by entering a URL into an internet browser while on an enterprise network. FIG. 5 is a model inventory overview display 500 in accordance with some embodiments of the present invention including an introductory message 510. Once a user accesses the model inventory overview display 500, he or she may then select "Model Maturity" from a hover menu that appear for various enterprise lines of business 520, 530, 540. In some embodiments, a user may select an "Overview" icon 522, a "Maturity" icon 524, or a "Synergy" icon 526 to obtain more detailed information (e.g., via a touchscreen or computer mouse pointer 590). Moreover, a "+" icon 550 might be selected to access inventory maintenance, reporting, enter a new a model, etc.

The model inventory provides detailed information about each service managed through a data science team. As such, the inventory serves a variety of purposes including:
   provide a visible listing of all services managed by the team,
   provide a base against which to look for potential model synergies,
   provide a base against which to measure service sophistication, and
   serve as a "parent" for other inventories and lists (e.g., an object inventory).

According to some embodiments, a "sophistication score" may be provided for every service owned by a data science team (including models and processes). The highest possible score for each service might be, by way of example, four.

Note that not every service will receive a maximum score and, in some cases (based on the use case and other factors), not every service should aspire to a four. That is, in some cases it is perfectly acceptable and reasonable that a service will score lower than four. The score should serve only to allow asset owners and leadership to understand and agree on the status of the suite and on where to focus improvements.

Figure 6:
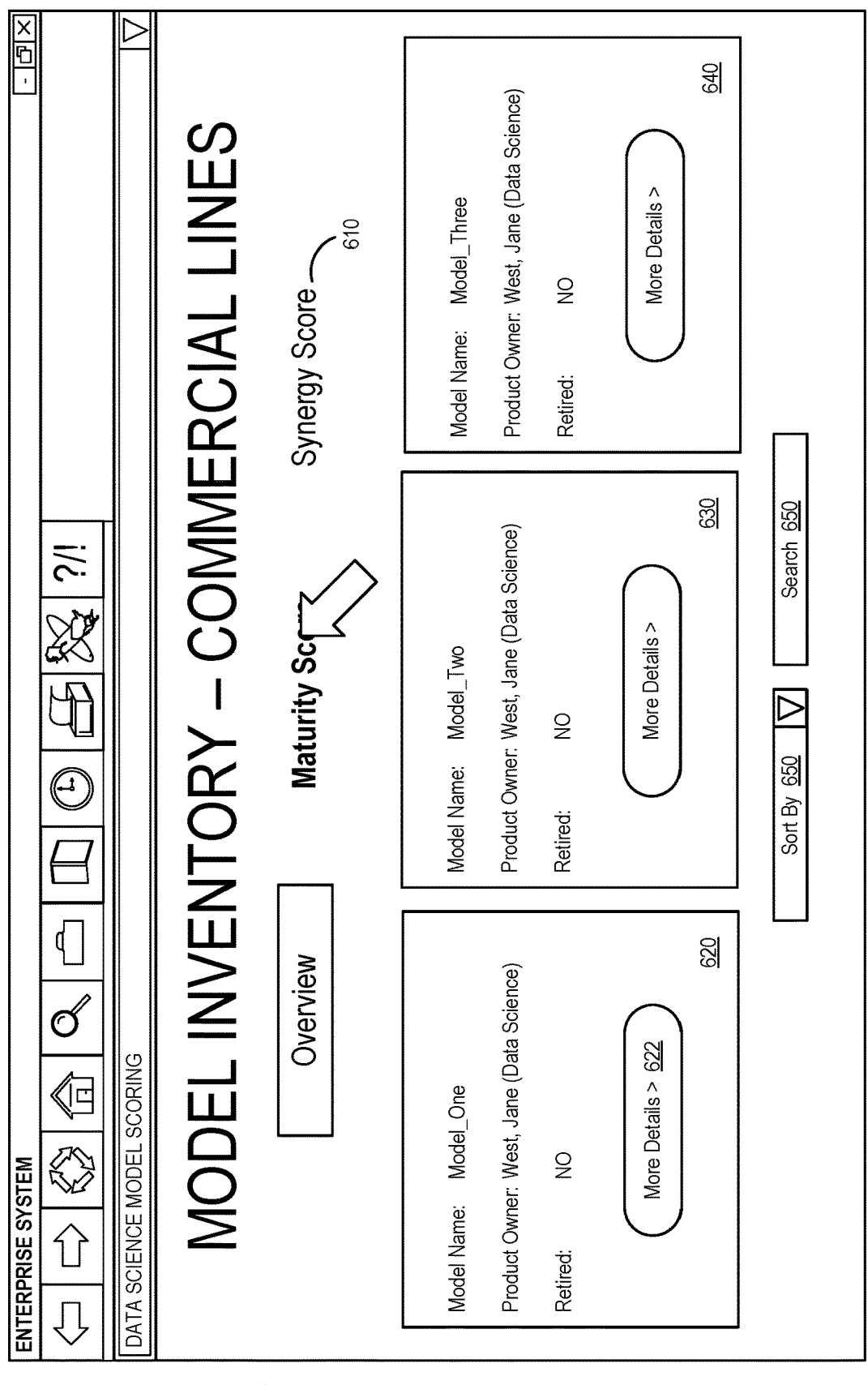
FIG. 6 is a model overview card display according to some embodiments of the present invention.

According to some embodiments, a model or asset owner may make changes to the services they are responsible for directly through a model inventory application. As these changes are made, scores will update automatically. For example, from an appropriate group (e.g., commercial lines 520, claims 530, or services 540), a user may click on the "Overview" icon 522 to access a model overview card display 600 for commercial lines as illustrated in FIG. 6 according to some embodiments of the present invention. The display 600 includes navigation icons 610 and model cards 620, 630, 630. Each card may include a model name, a product owner, and an indication of whether the model is retired along with a "More Details" icon 622 to let a user see more information about that model. The display 600 may also let a user sort 650 and/or search 660 the cards.

Figure 7:
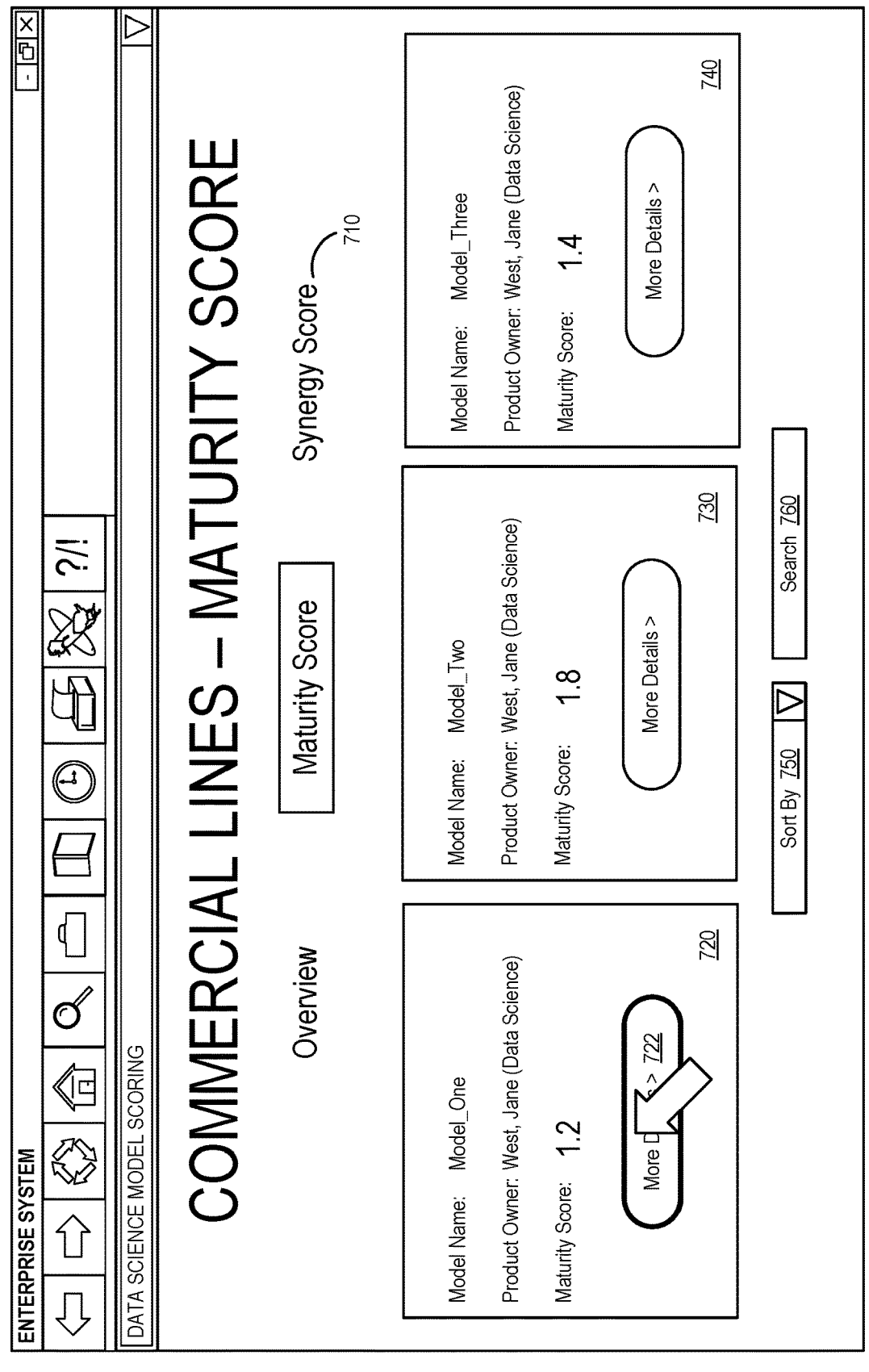
FIG. 7 is a maturity score display in accordance with some embodiments of the present invention.

Selection of a "Maturity Score" navigation icon 610 will let a user access a maturity score display 700 as shown in FIG. 7 in accordance with some embodiments of the present invention. The display 700 includes navigation icons 710 and model cards 720, 730, 730. Each card may include a model name, a product owner, and an overall maturity score for the model along with a "More Details" icon 722 to let a user see more information about that model. The display 700 may also let a user sort 750 and/or search 760 the cards.

Figure 8:
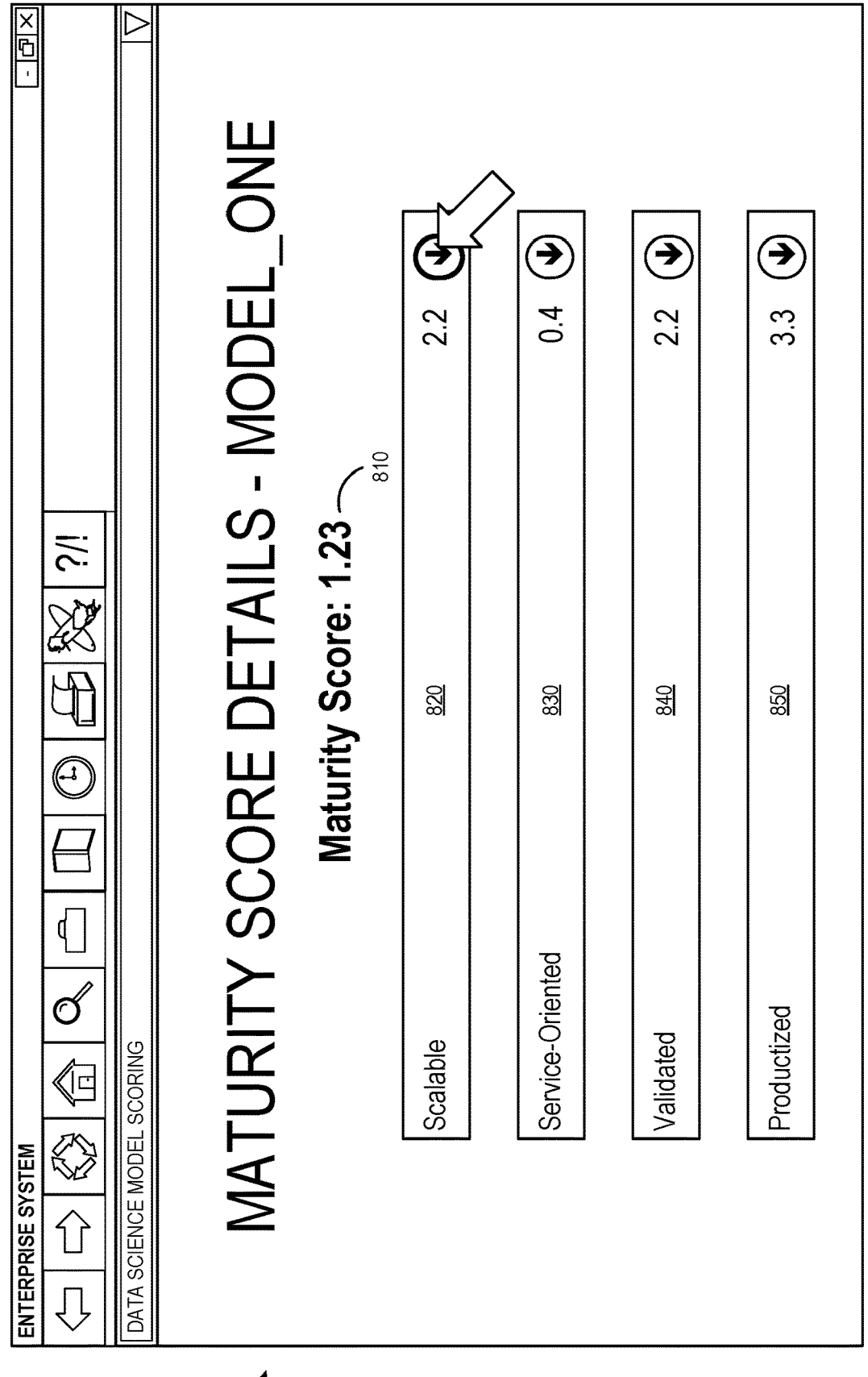
FIG. 8 is a model category score display according to some embodiments of the present invention.

Selection of the "More Data" icon 722 will let a user access a maturity score details display 700 as shown in FIG. 8 in accordance with some embodiments of the present invention. The display 800 includes an overall maturity score 810 for the model that has been calculated based on the following values: a scalable 820 score, a service-oriented 830 score, a validated 840 score, and a productized 850 score. The overall maturity score 810 might comprise an average of these scores 820, 830, 840, 850. In some embodiments, the overall maturity score 810 might instead be calculated as follows:

$$\text{score}_{overall} = w_1 \text{score}_{scalable} + w_2 \text{score}_{s\text{-}o} + w_3 \text{score}_{validated} + w_4 \text{score}_{productized}$$

where $w_1$ through $w_4$ are weights (e.g., manually assigned by the enterprise or automatically generated by a machine learning algorithm).

Figure 9:
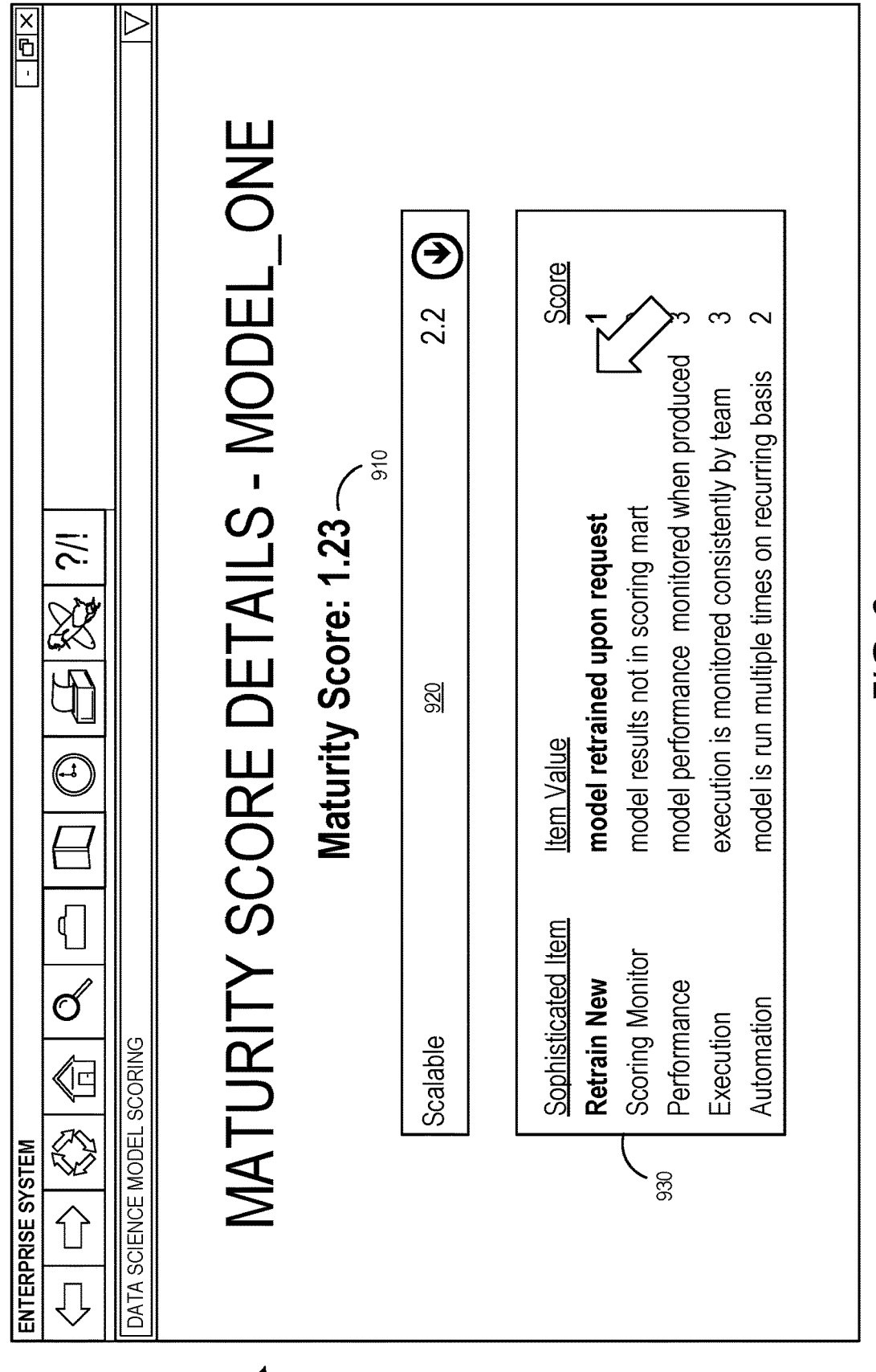
FIG. 9 is a scalable score detail display in accordance with some embodiments of the present invention.

Selection of the scalable score 820 will result in a scalable score detail display 900 as shown in FIG. 9 according to some embodiments of the present invention. The display 900 includes an overall maturity score 910 for the model along with a scalable score value 920 that has been calculated based on rubric values 930 such as: a retrain new score, a scoring monitor score, a performance score, an execution score, and an automation score. The scalable score value 920 might comprise an average of those scores (either a straight-up average or a weighted average).

Figure 10:
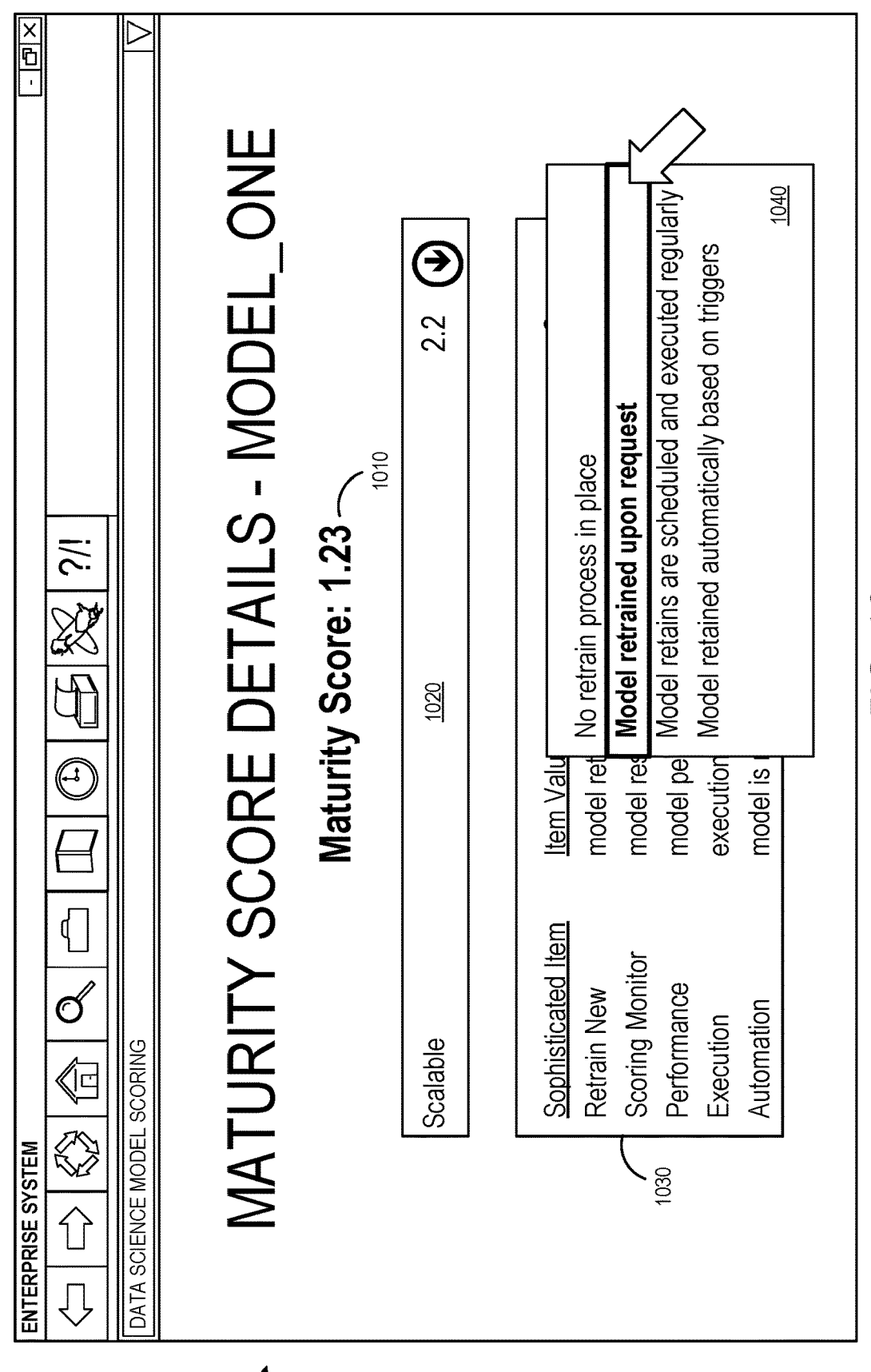
FIG. 10 is a form view editing display according to some embodiments of the present invention.

An authorized user may then edit the rubric values as appropriate. For example, FIG. 10 is a form view editing display 1000 according to some embodiments of the present invention. As before, the display 1000 includes an overall maturity score 1010 for the model along with a scalable score value 1020 that has been calculated based on rubric values 1030. To edit a rubric value 1030, the user may proceed to line item that requires a change and select from a dropdown menu 1040. If there is no dropdown menu 1040, the user can enter the appropriate information. Examples of entries without dropdown menus include "Yes/No" answers (which are handled simply with a checkbox where a check means "Yes") and date fields for which calendar function- ality is provided to ensure the appropriate format. When the new rubric value 1030 is selected or entered, the scalable score 1020 and overall maturity score 1010 for that model may be automatically re-calculated.

Figure 11:
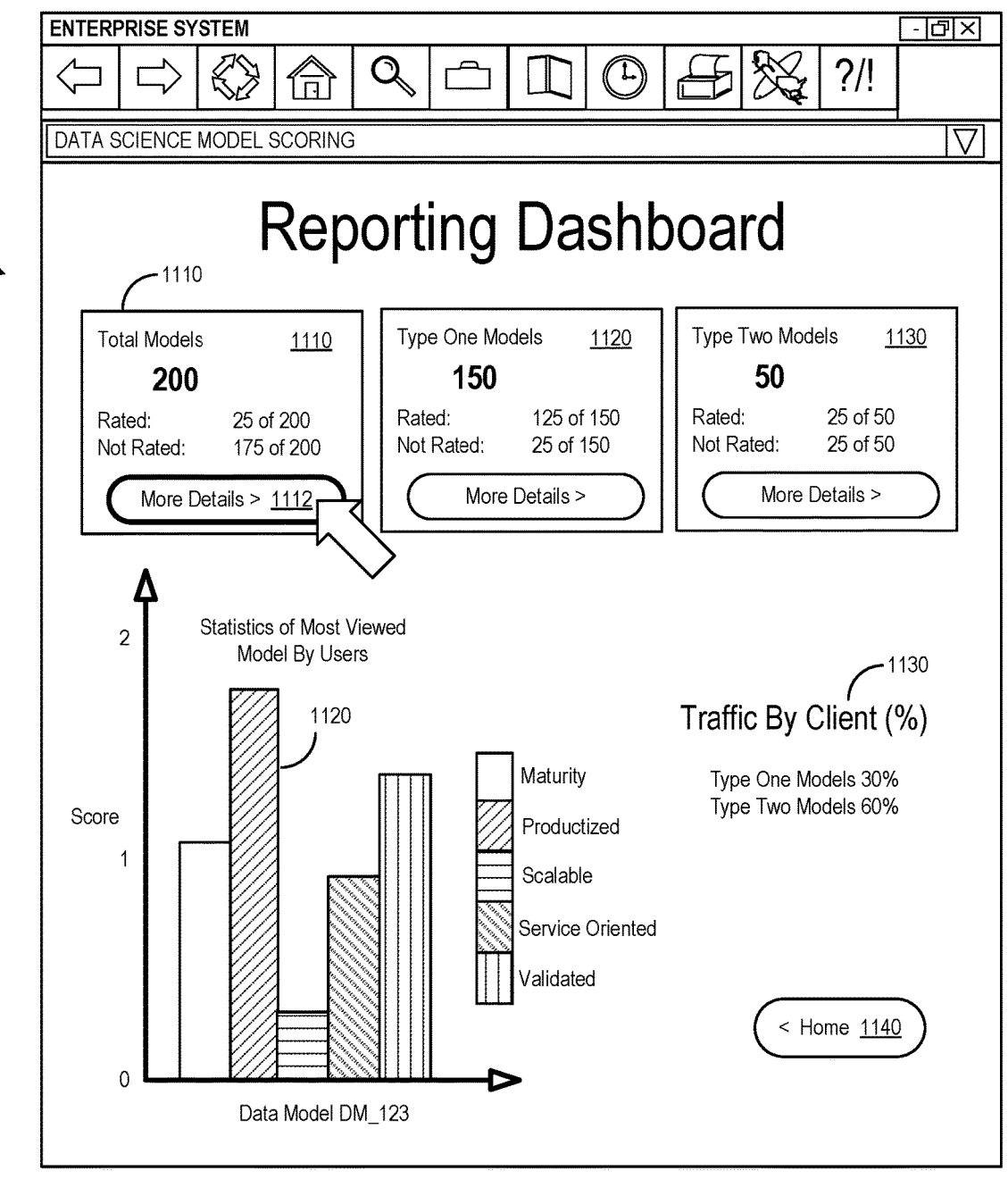
FIG. 11 is a reporting dashboard display in accordance with some embodiments of the present invention.

According to some embodiments, model dashboard infor- mation may also be provided. For example, FIG. 11 is a reporting dashboard display 1100 in accordance with some embodiments of the present invention. The reporting dash- board may contain overall statistics of all models and/or categories. According to some embodiments, the display 1100 includes multiple cards 1110 that show the statistics including model count in each category as well as overall count of models. It also shows counts of models that are retired and unretired. The display 1100 might further include:

a bar-chart 1120 that shows the statistics of most viewed
        model by users,
    a pie-chart that shows the user traffic 1130 of each
        category visited by users, and
    a calendar-chart that shows user-activity (number of users
        visiting the page).
Selection of a "Home" icon 1140 may return the user to the model inventory overview display 500.

Figure 12:
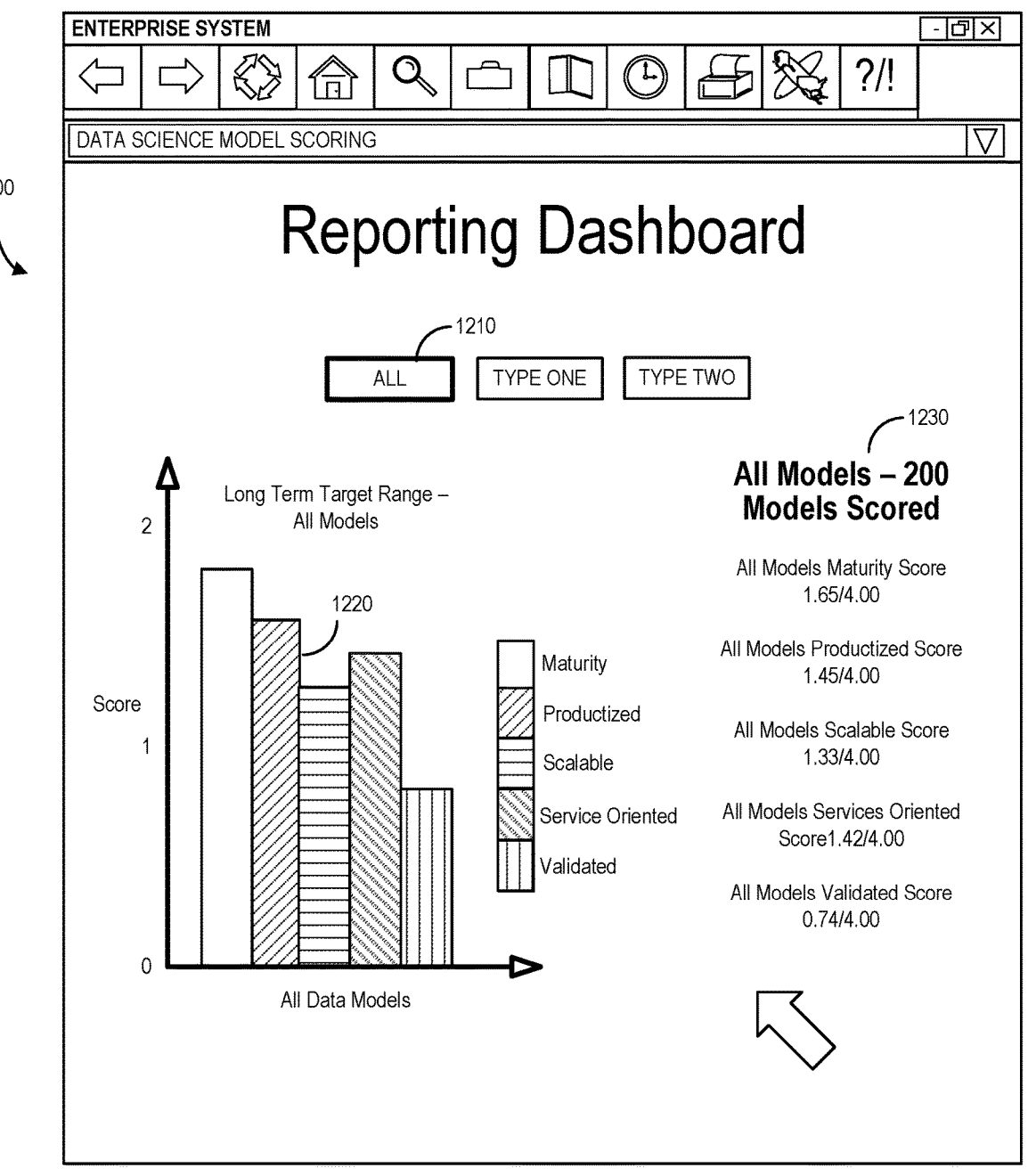
FIG. 12 is an overall model statistical display according to some embodiments of the present invention.

Selection of a "More Details" icon 1112 results in an overall model statistical display 1200 as shown in FIG. 12 according to some embodiments of the present invention. A user may select 1210 to view information about all model types or specific model types (e.g., filtered based on cat- egory, product owners, and/or specifically selected groups of models). The information may include a bar-chart 1220 showing both overall maturity scores and underlying cat- egory scores along with a numerical presentation 1230 of that information. According to some embodiments, selected model statistics can be exported as a PDF file by clicking on a "PDF" icon.

Figure 13:
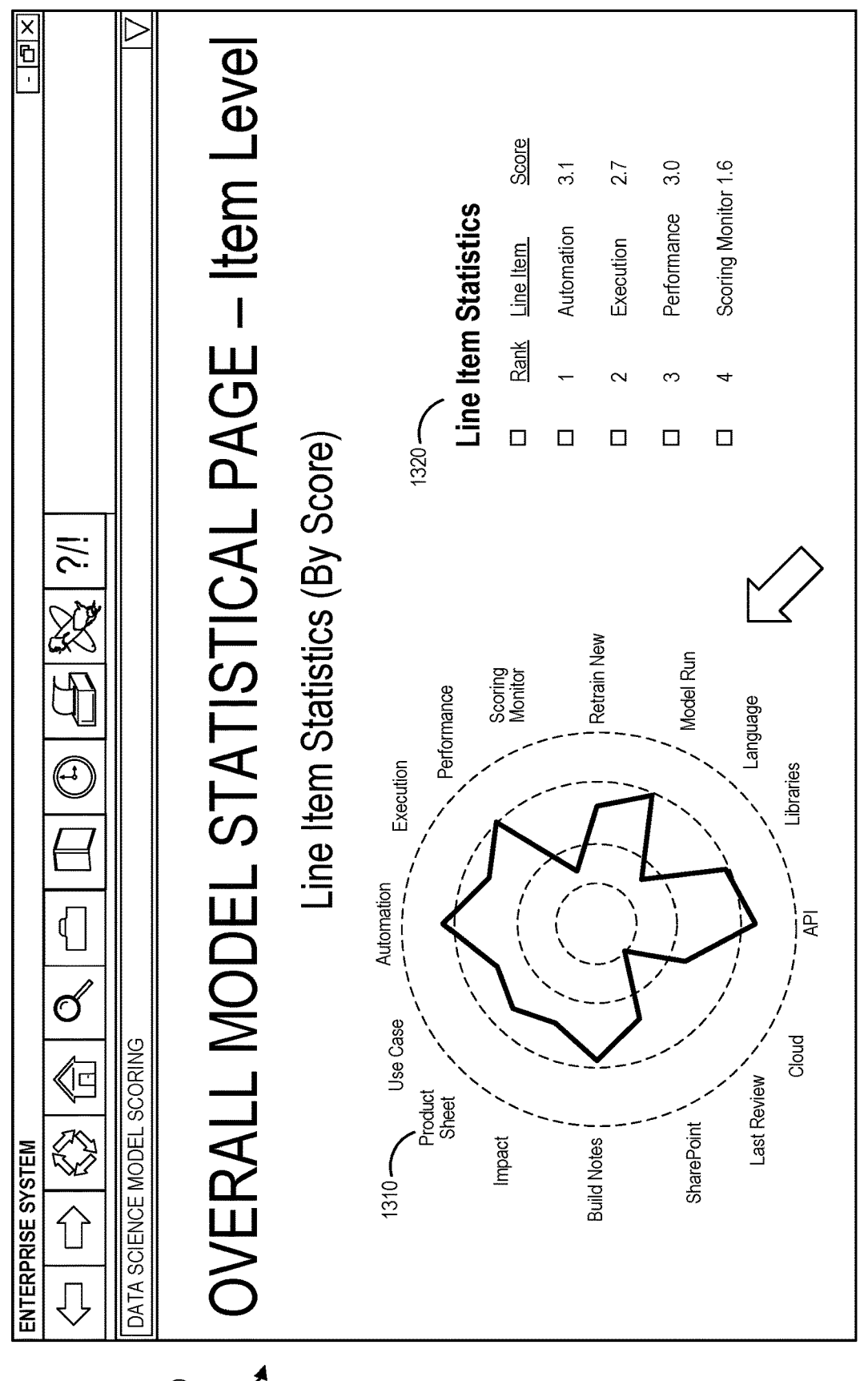
FIG. 13 is an item level statistics graphical display in accordance with some embodiments of the present invention.
Figure 14:
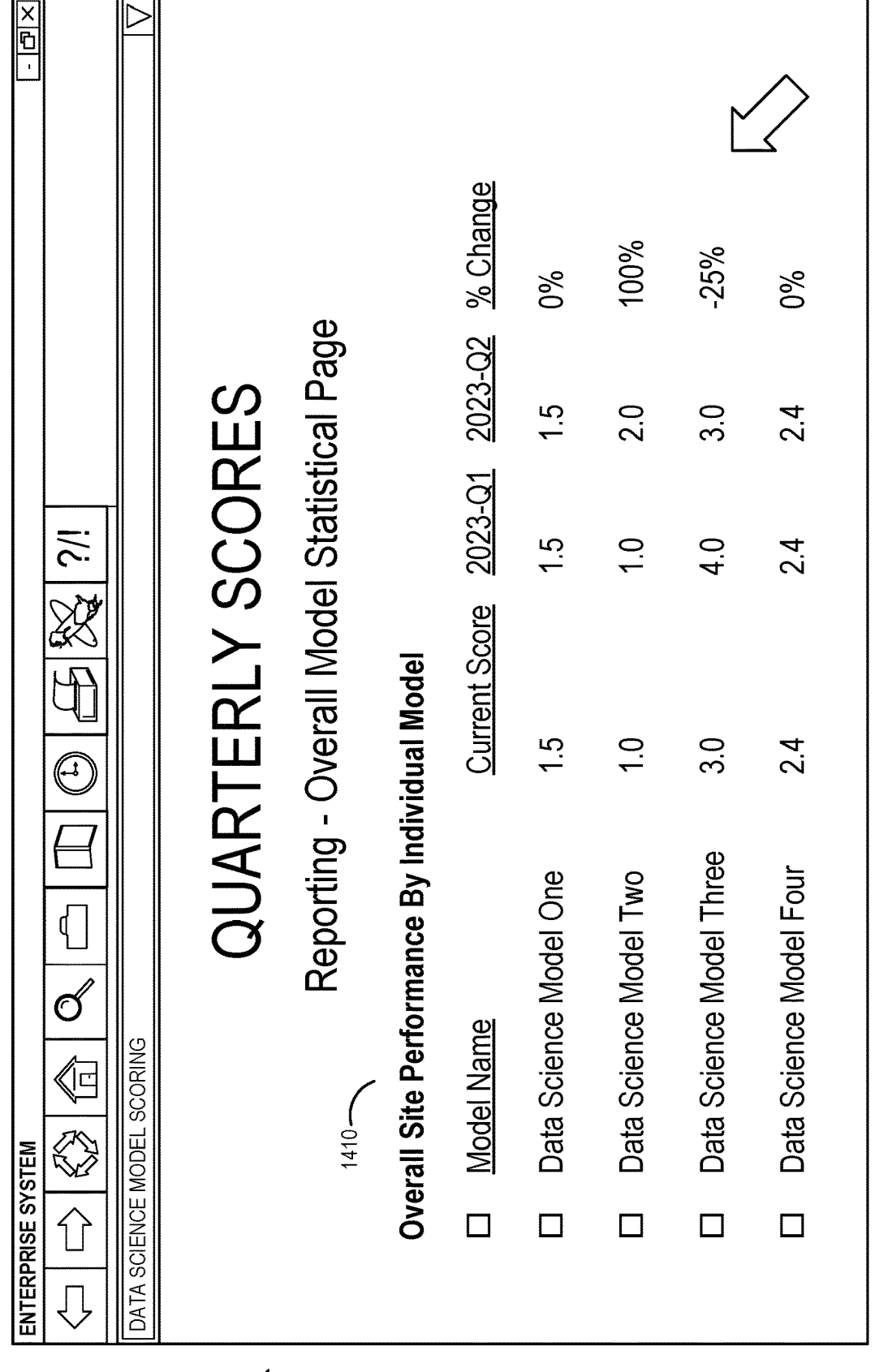
FIG. 14 is a quarterly historic score display according to some embodiments of the present invention.
Figure 15:
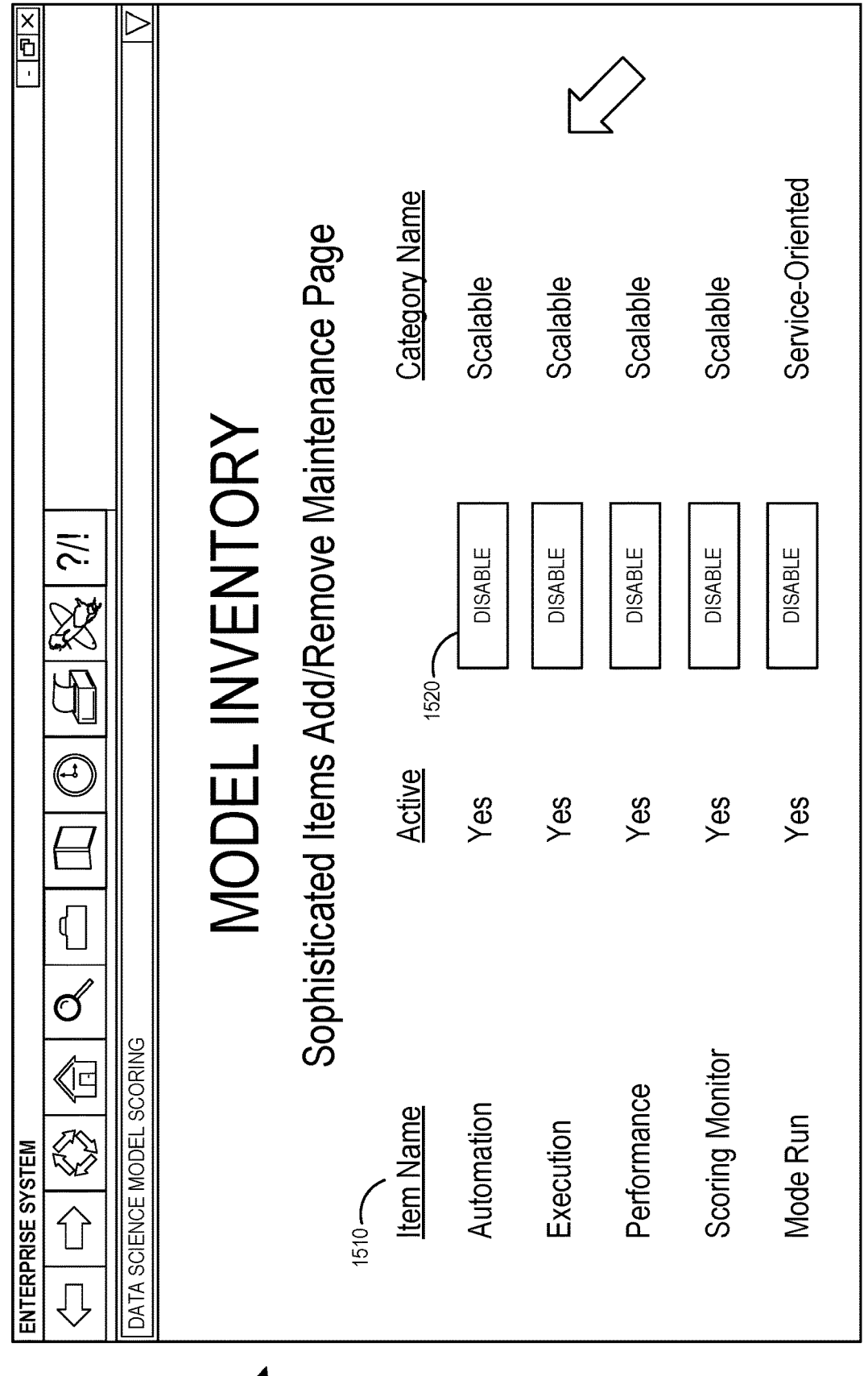
FIG. 15 is an item maintenance display in accordance with some embodiments of the present invention.

FIG. 13 is an item level statistics graphical display 1300 in accordance with some embodiments of the present inven- tion. The display 1300 includes a polar coordinate graph 1310 plotting various category or item scores. The area within the graph 1310 may be calculated and represent an overall quality or maturity of the model. That is, the item level statistics for the selected models can be seen in the radar-chart that depicts the item level details for selected models and a table 1320 represents a tabular representation of the statistics (and in some embodiments can be exported to an EXCEL® spreadsheet application using an export button). FIG. 14 is a quarterly historic score display 1400 according to some embodiments of the present invention. The display 1400 includes overall site performance infor- mation 1410 for an individual model over time. For example, scores of models for each quarter might be com- pared in a quarter data comparison segment. Flexible year and month filters may be provided to compare any two quarters of the time periods. FIG. 15 is an item maintenance display 1500 in accordance with some embodiments of the present invention. The display 1500 includes a table 1510 may be used to "Disable" 1520 various items in each category (and those items will no longer be used in score calculations).

Figure 16:
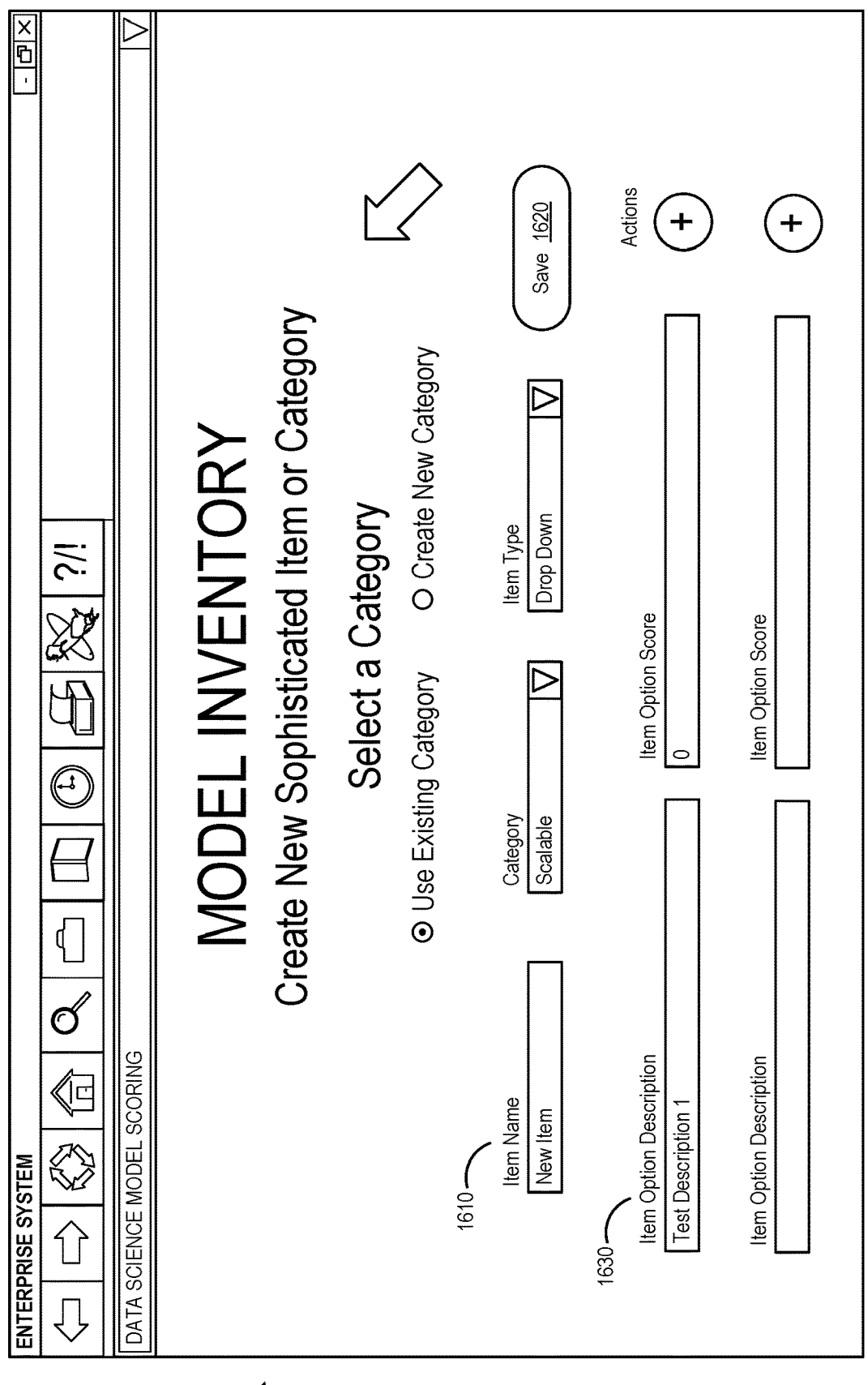
FIG. 16 is a create new item or category display according to some embodiments of the present invention.
Figure 17:
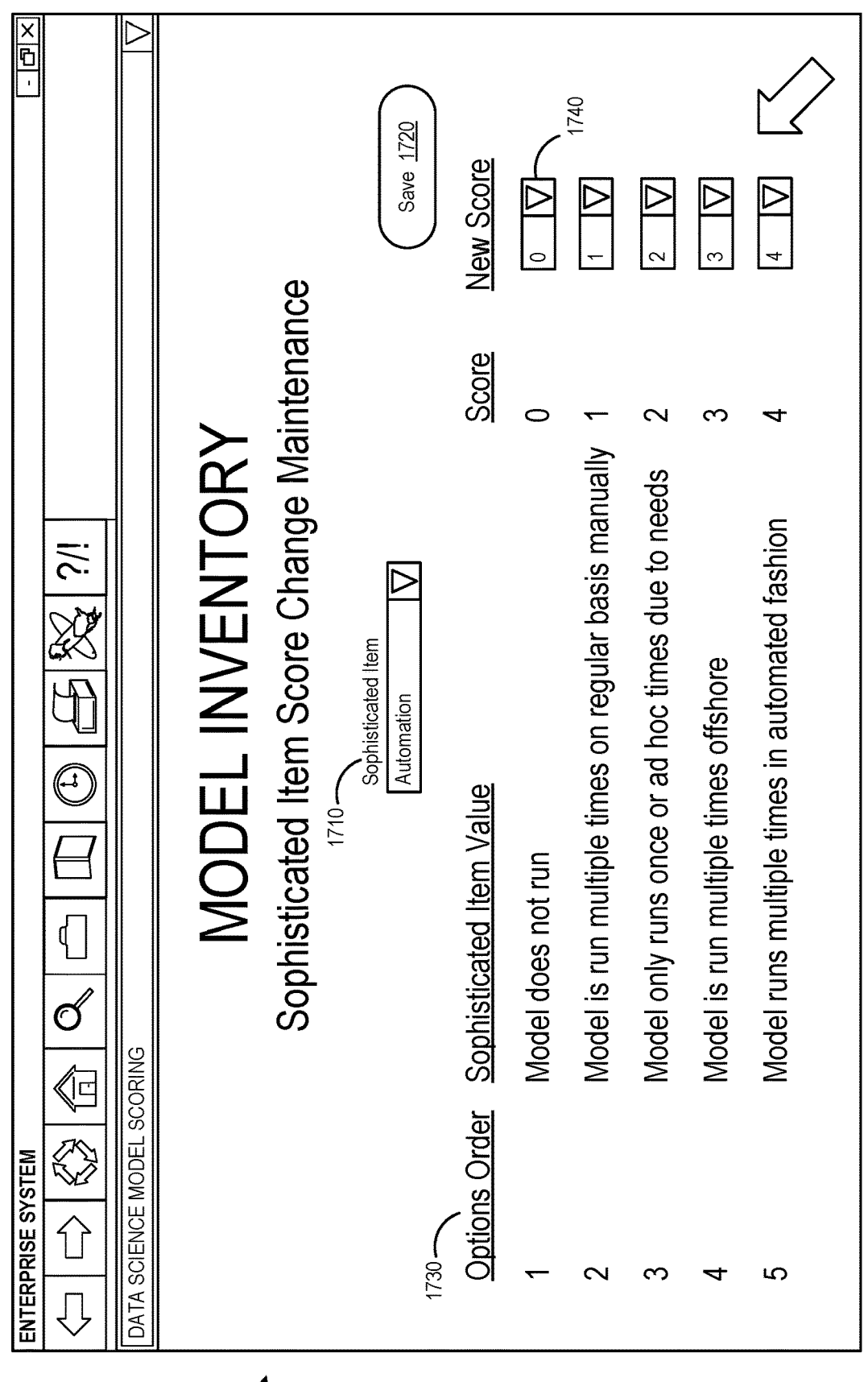
FIG. 17 is an item score change management display in accordance with some embodiments of the present invention.
Figure 18:
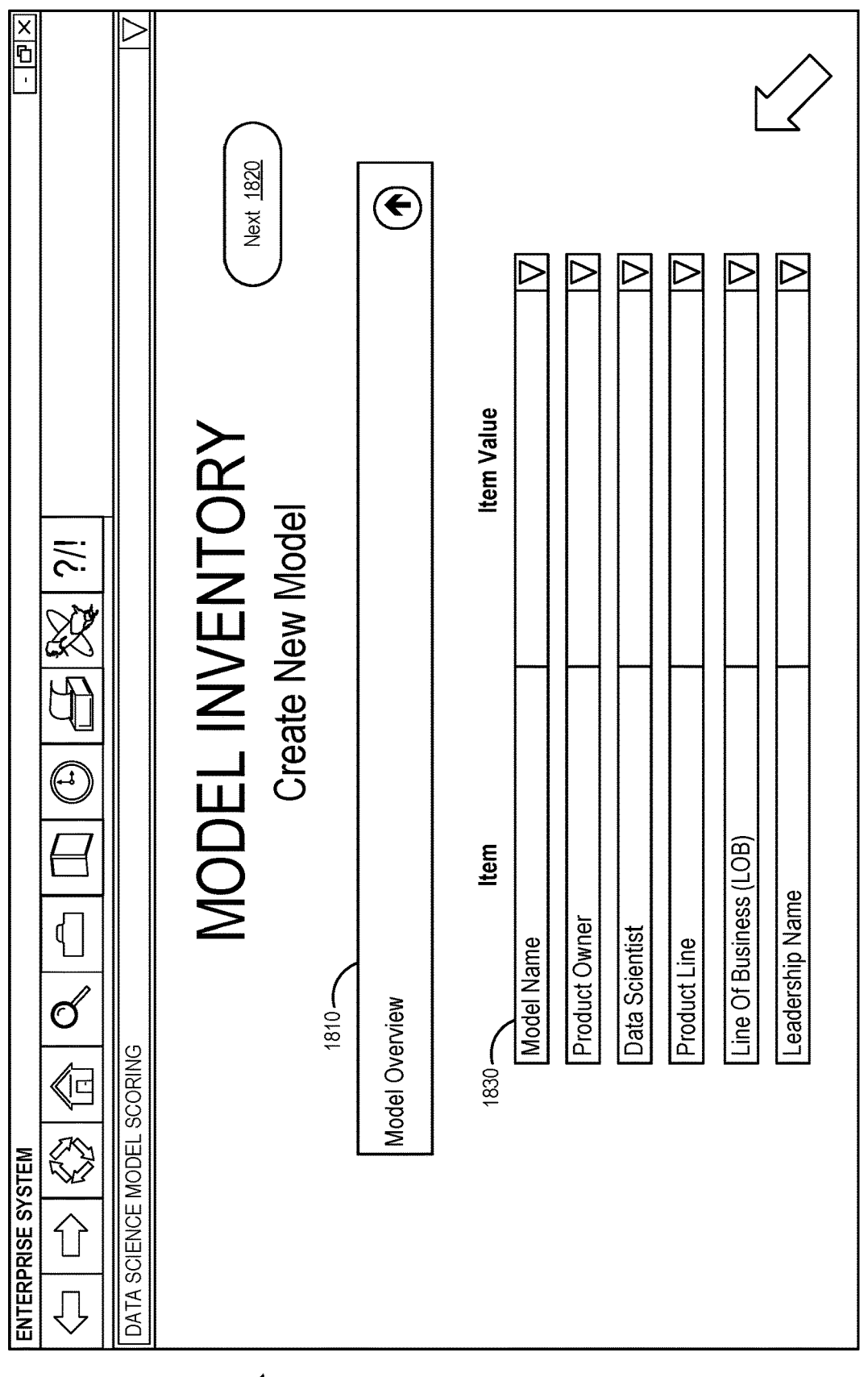
FIG. 18 is a create new model display according to some embodiments of the present invention.

FIG. 16 is a create new item or category display 1600 according to some embodiments of the present invention. The user might, for example, add a new item to an existing category or create a new category for the item. The display 1600 lets the user enter 1610 an item name, category, item type, etc. and then store that data with a "Save" icon 1620. The display 1600 also lets the user enter 1630 an item description, item option score, etc. FIG. 17 is an item score change management display 1700 in accordance with some embodiments of the present invention. The display 1700 lets a user select a sophisticated item 1710 and store the selection with a "Save" icon 1720. A table 1730 lists the item values and lets the user assign new scores 1740 for each item value. FIG. 18 is a create new model display 1800 according to some embodiments of the present invention. The user may enter a model category 1810 and assign values 1830 for various item values such as a model name, a product owner, a data scientist, a product line, a line of business, etc. (and then proceed to enter rubric information for the new data science model by selecting a "Next" icon 1820).

Figure 20:
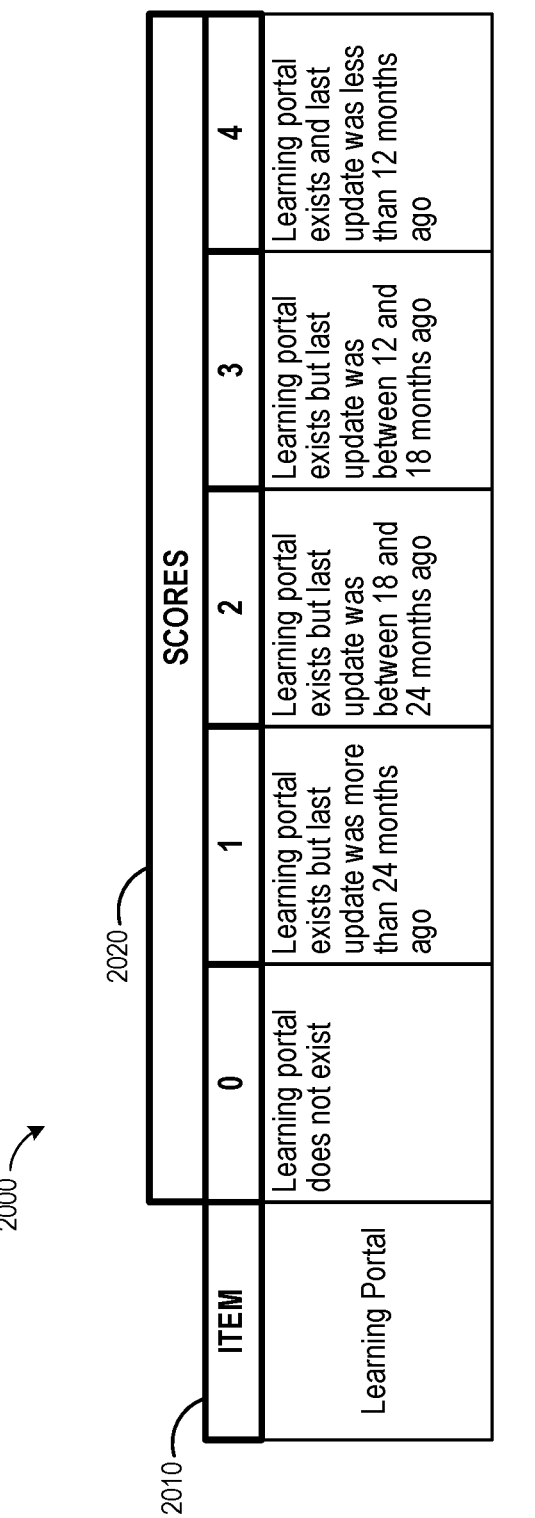
FIG. 20 is a scores table according to some embodiments of the present invention.

Models may be based on scoring rubrics. For example, a scoring rubric may include a set of scored items that represent what is being scored or evaluated. For each scored item, an "intent" might indicate what is believed to be the purpose of the line item. A "definition" may provide addi- tional detail about what is actually being measured, and an "ideal" might indicate key attributes that would be found in an ideal model (and may be used to ensure appropriate gradients for scoring). For example, FIG. 19 is an example of a definition table 1900 that shows a scored item 1910 (i.e., "Build/Release Notes"), an intent 1920, a definition 1930, and an ideal 1940 in accordance with some embodiments of the present invention. FIG. 20 is a scores table 2000 accord- ing to some embodiments of the present invention. Here, a set of scores 2020 are provided for an item 2010 (i.e., a "Learning Portal") with specific guidelines being provided for each possible score 2020.

Because of the way in which the model inventory is utilized across multiple use cases, it may be important that information is kept as up to date as possible. Once the model inventory and scores have been initially populated, there are two potential update scenarios. The first scenario is when there is a change to the information contained in the model inventory or scores due to updated documentation or model changes. The second scenario rises when new models are moved into production.

With respect to making changes to an existing and logged service, a model or asset owner may have the ability and access to change information on both the model inventory and scores for the models, assets, and services they own. With respect to moving a new service into production, when a new model is moved into production the model or asset owner should choose an "Add a Service: icon on a model inventory home screen. Once this icon is chosen, a form will be presented to the user to complete with information needed for both the model inventory as well as the associ- ated scores.

Figure 21:
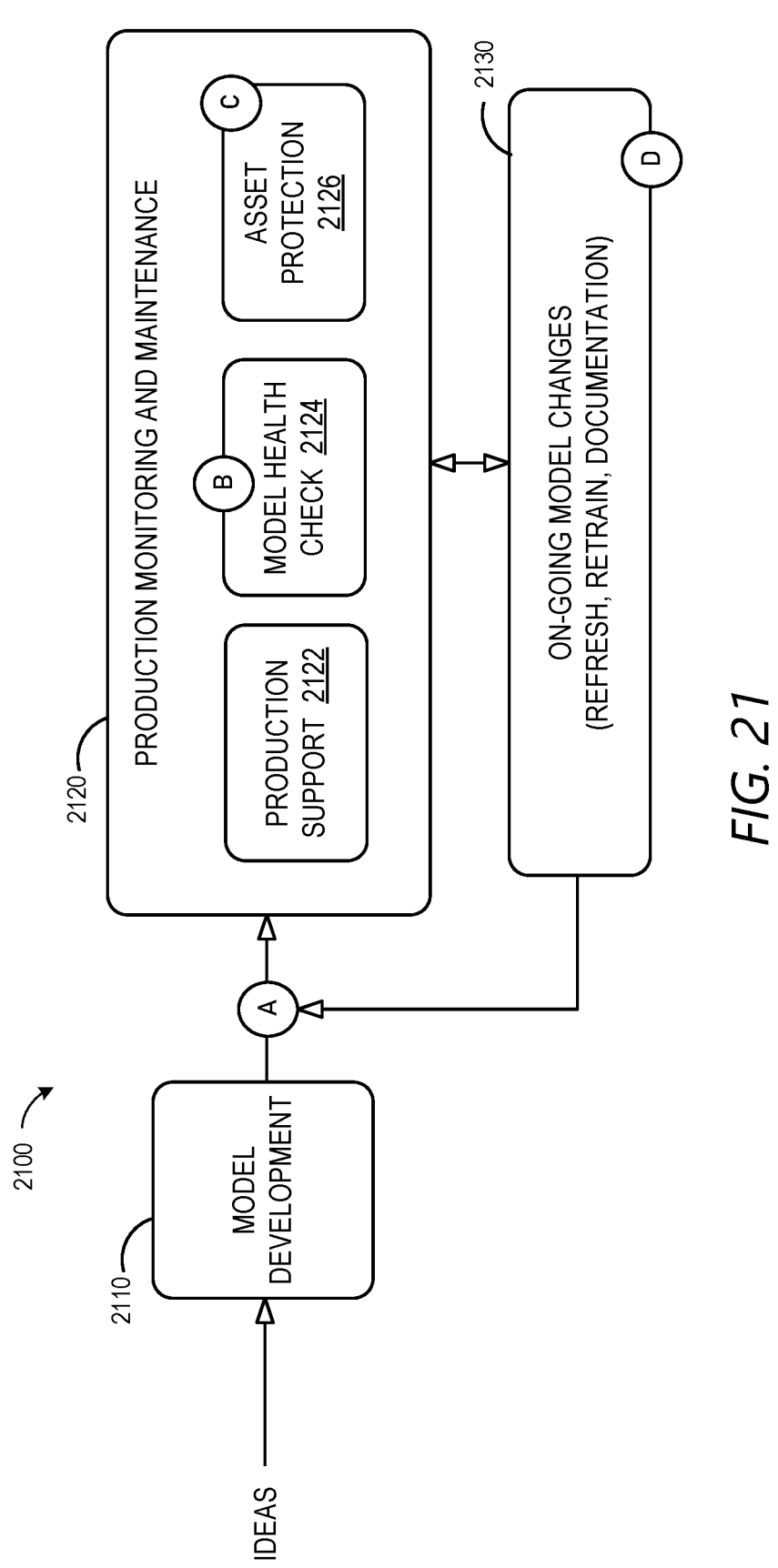
FIG. 21 is an example of proposed gates and audits in accordance with some embodiments of the present invention.

Although scores will change each time a change is made to the inventory scores, it may be recorded quarterly (e.g., on the first Friday of the last month of the quarter). Reminders of upcoming scoring activity may be automatically gener- ated and transmitted prior to the scores being run and recorded. FIG. 21 is an example of proposed gates and audits 2100 in accordance with some embodiments of the present invention. When a model is moved from model development 2110 to production monitoring and maintenance 2120, at (A) acceptance criteria for the model may be applied including inventory information. To maintain the integrity of the inventory, information housed in the inventory and the associated scores may be reviewed during model health checks 2124 at (B) and when new models or retrained/ refreshed models are moved over to production support 2122. At (C), the system may run periodic scans as part of asset protection 2126 to understand what new models have been pushed to production. At (D), on-going model changes 2130 may include providing asset owners with rights to change information in the inventory as needed.

FIG. 22 is a more detailed high-level block diagram of a system 2200 in accordance with some embodiments. As before, the system 2200 includes a data science model score server 2250 that may access information in a current and historic model data store 2210. The data science model score server 2250 may also retrieve information from a machine learning process 2220, an Artificial Intelligence ("AI") algorithm 2230, and/or predictive models 2240 in connection with an evaluation engine 2255. The data science model score server 2250 may also exchange information with user 2260 (e.g., via communication port 2265 that might include a firewall) to enable a manual review of model performance. According to some embodiments, evaluation feedback is provided to the machine learning process 2220 (e.g., so that scoring weight can be automatically improved). The data science model score server 2250 might also transmit information directly to an email server (or postal mail server), a workflow application, and/or a calendar application 2270 to facilitate data science model management.

The data science model score server 2250 may store information into and/or retrieve information from the current and historic model data store 2210. The current and historic model data store 2210 might, for example, store electronic records 2212 representing a plurality data science models, each electronic record having a set of attribute values including a model identifier 2214, a maturity score 2216, synergy score 2218, etc. According to some embodiments, the system 2200 may also provide a dashboard view of data science model information.

Figure 23:
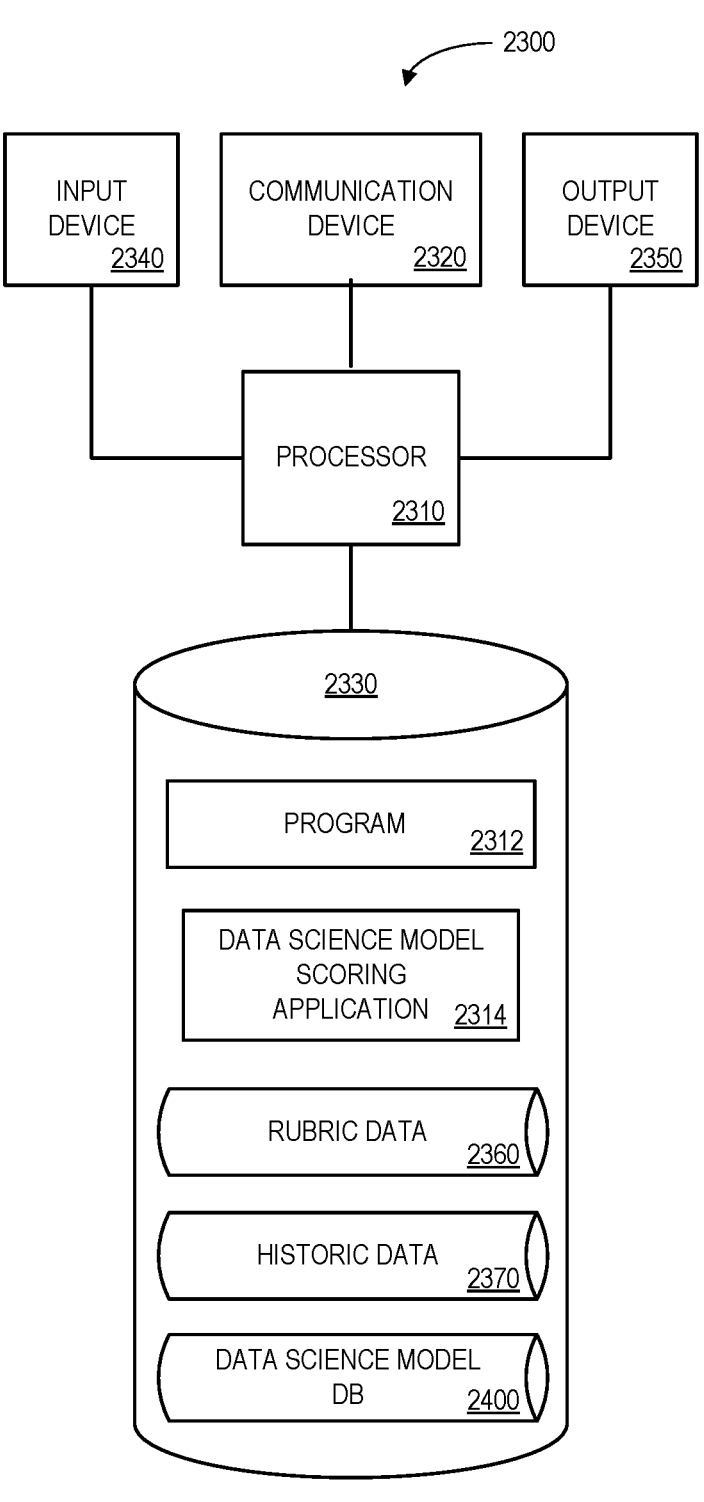
FIG. 23 is a block diagram of an apparatus or platform in accordance with some embodiments of the present invention.

The embodiments described herein may be implemented using any number of different hardware configurations. For example, FIG. 23 illustrates an apparatus or platform 2300 that may be, for example, associated with the systems 200, 2200 of FIG. 2 or 22 respectively (or any other system described herein). The platform 2300 comprises a processor 2310, such as one or more commercially available Central Processing Units ("CPUs") in the form of one-chip microprocessors, coupled to a communication device 2320 configured to communicate via a communication network (not shown in FIG. 23). The communication device 2320 may be used to communicate, for example, with one or more remote devices. The platform 2300 further includes an input device 2340 (e.g., a mouse and/or keyboard to enter model information or adjustments) and an output device 2350 (e.g., a computer monitor to display a model scores or statistics).

The processor 2310 also communicates with a storage device 2330. The storage device 2330 may comprise any appropriate information storage device, including combinations of magnetic storage devices (e.g., a hard disk drive), optical storage devices, mobile telephones, and/or semiconductor memory devices. The storage device 2330 stores a program 2312 and/or a data science model scoring application 2314 for controlling the processor 2310. The processor 2310 performs instructions of the programs 2312, 2314, and thereby operates in accordance with any of the embodiments described herein. For example, the processor 2310 may receive (from a remote user device) an indication of a selected data science model. The processor 2310 may then retrieve information about the selected data science model. Based on the retrieved information, the processor 2310 may automatically calculate a maturity score for the selected data science model in accordance with a scalable score, a service-oriented score, a validated score, and a productized score. When the processor 2310 receives from the remote user device an adjustment to at least one of the scalable score, the service-oriented score, the validated score, and the productized score, it may automatically re-calculate the maturity score for the selected data science model.

The programs 2312, 2314 may be stored in a compressed, uncompiled and/or encrypted format. The programs 2312, 2314 may furthermore include other program elements, such as an operating system, a database management system, and/or device drivers used by the processor 2310 to interface with peripheral devices.

As used herein, information may be "received" by or "transmitted" to, for example: (i) the platform 2300 from another device; or (ii) a software application or module within the platform 2300 from another software application, module, or any other source.

In some embodiments (such as shown in FIG. 23), the storage device 2330 stores rubric data 2360 (e.g., defining how a model should be scored and evaluated), historic data 2370 (e.g., to evaluate a model over time and/or to train an AI algorithm), and a data science model database 2400. An example of a database that may be used in connection with the wage statement platform 2300 will now be described in detail with respect to FIG. 24. Note that the database described herein is only one example, and additional and/or different information may be stored therein. Moreover, various databases might be split or combined in accordance with any of the embodiments described herein.

Referring to FIG. 24, a table is shown that represents the data science model database 2400 that may be stored at the wage statement platform 2300 according to some embodiments. The table may include, for example, entries identifying models that are being scored and evaluated. The table may also define fields 2402, 2404, 2406, 2408, 2410 for each of the entries. The fields 2402, 2404, 2406, 2408, 2410, may, according to some embodiments, specify: a data science model identifier 2402, a model name 2404, maturity score 2406, detailed maturity category scores 2408, and historical quarterly scores 2410. The information in the data science model database 2400 may be created and updated, for example, based on information received from a model inventory.

The data science model identifier 2402 may be, for example, a unique alphanumeric code identifying a particular data science model being evaluated or scores (as indicated by the model name 2404). The maturity score 2406 may indicate a score that was automatically calculated for that model based on the detailed maturity category scores 2408 (e.g., a scalable score, a service-oriented score, a validated score, and a productized score). The historical quarterly scores 2410 may represent scores over time to determine whether they are improving (or degrading).

Thus, some embodiments may provide improved data science model monitoring, evaluation, and scoring. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

13

Figure 25:
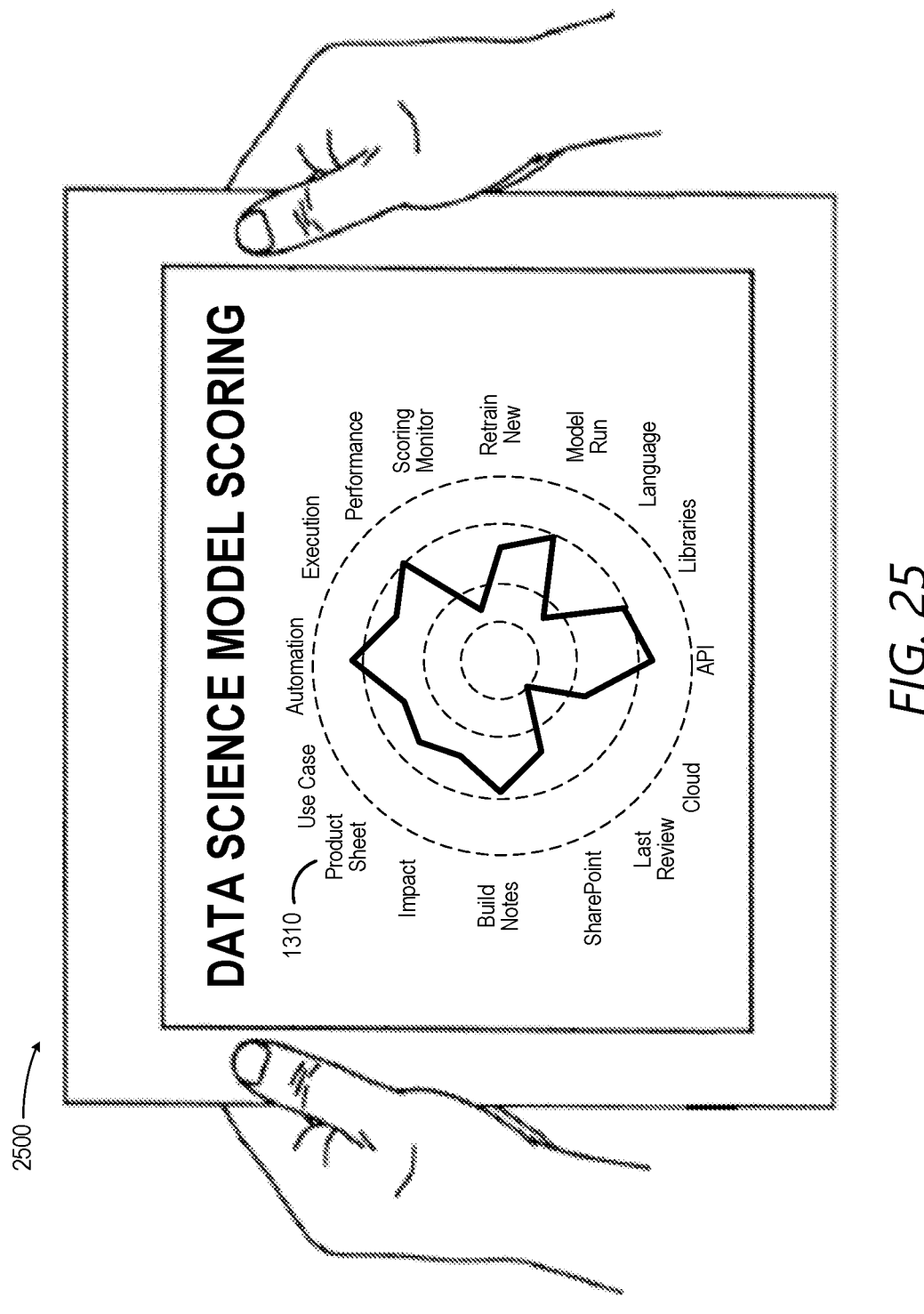
FIG. 25 illustrates a display in accordance with some embodiments described herein.

Although specific hardware and data configurations have been described herein, note that any number of other configurations may be provided in accordance with embodiments of the present invention (e.g., some of the information associated with the databases described herein may be combined or stored in external systems). Moreover, some embodiments have been described herein as being accessed via a PC or laptop computer. Note, however, that embodiments may be implemented using any device capable of executing the disclosed functions and steps. For example, FIG. 25 illustrates a display 2500 in accordance with some embodiments described herein. In particular, the display 2500 includes a graphical user interface including a radargraph or polar coordinate representation displayed via a tablet computer or smartphone in accordance with any of the embodiments described herein.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A system to facilitate data science model score management for an enterprise, comprising:

(a) a data science model score database containing encrypted electronic records, each encrypted record including a data science model identifier and a set of data science model scores generated for the enterprise;

(b) a data science model score server, coupled to the data science model score database, including:

a computer processor for executing program instructions; and a memory, coupled to the computer processor, storing program instructions that, when executed by the computer processor, cause the data science model score server to:

(i) receive, from a user via a remote user device, an indication of a selected data science model, (ii) retrieve, from the data science model score database, information about the selected data science model without retrieving information about other data science models, (iii) based on the retrieved information, automatically calculate a maturity score for the selected data science model in accordance with a scalable score, a service-oriented score, a validated score, and a productized score along with associated scoring weights, (iv) receive from the remote user device an adjustment to at least one of the scalable score, the service-oriented score, the validated score, and the productized score, (v) responsive to the adjustment, automatically re-calculate the maturity score for the selected data science model, (vi) provide evaluation feedback to a machine learning process so that scoring weights can be automatically improved;

(c) a communication port coupled to the data science model score that transmits data to the remote user device supporting a graphical interactive user interface display via a distributed communication network, the graphical interactive user interface including the maturity score along with a plurality of historical maturity scores and a reporting dashboard with a radar chart plotting current data science model values including: an automation rubric value, an execution rubric value, and a performance rubric value, wherein the plotted current data science model values plot a shape having an area and the area represents an overall maturity score for the current data science model; and (d) an email server and a calendar application, coupled to the data science model score server, to automatically establish communication links to provide data science model reports and alerts to the user.

2. The system of claim 1, wherein the scalable score includes information about, for the selected data science model: monitored model data and automated model data.

3. The system of claim 2, wherein the service-oriented score includes information about, for the selected data science model: standardized model data, aligned model data, and cloud-based model data.

4. The system of claim 3, wherein the validated score includes information about, for the selected data science model: audit validated model data, updated model data, and reviewed model data.

5. The system of claim 4, wherein the productized score includes information about, for the selected data science model: documented model data, impacting model data indicating a measurable impact of the selected data science model, accessible knowledge-based model data, and marketed and communicated model data indicating benefits associated with the selected data science model.

6. The system of claim 1, wherein the data science model score server is further to automatically calculate a synergy score for the selected data science model, and the synergy score is a measurement that determines whether solutions output by each of a machine learning predictive model and an artificial intelligence predictive model are similar.

7. The system of claim 1, wherein at least some scores are associated with user-selectable rubric item options in a drop-down menu.

8. A computer-implemented method to facilitate data science model score management for an enterprise, comprising:

receiving, at a computer processor of a data science model score server from a user via a remote user device, an indication of a selected data science model;

retrieving, from a data science model score database, information about the selected data science model without retrieving information about other data science models, wherein the data science model score database contains encrypted electronic records, each encrypted record including a data science model identifier and a set of data science model scores generated for the enterprise;

based on the retrieved information, automatically calculating a maturity score for the selected data science model in accordance with a scalable score, a service-oriented score, a validated score, and a productized score along with associated scoring weights;

receiving from the remote user device an adjustment to at least one of the scalable score, the service-oriented score, the validated score, and the productized score;

responsive to the adjustment, automatically re-calculating the maturity score for the selected data science model;

providing evaluation feedback to a machine learning process so that scoring weights can be automatically improved;

transmitting data to the remote user device in support of a graphical interactive user interface including the maturity score along with a plurality of historical maturity scores and a reporting dashboard with a radar chart plotting current data science model values including: an automation rubric value, an execution rubric value, and a performance rubric value, wherein the plotted current data science model values plot a shape having an area and the area represents an overall maturity score for the current data science model; and automatically establishing communication links via an email server and a calendar application to provide data science model reports and alerts to the user.

9. The method of claim 8, wherein the scalable score includes information about, for the selected data science model, at least one of: monitored model data and automated model data.

10. The method of claim 8, wherein the service-oriented score includes information about, for the selected data science model, at least one of: standardized model data, aligned model data, and cloud-based model data.

11. The method of claim 8, wherein the validated score includes information about, for the selected data science model, at least one of: audit validated model data, updated model data, and reviewed model data.

12. The method of claim 8, wherein the productized score includes information about, for the selected data science model, at least one of: documented model data, impacting model data, accessible knowledge-based model data, and marketed and communicated model data.

13. The method of claim 8, wherein the data science model score server is further to automatically calculate a synergy score for the selected data science model, and the synergy score is a measurement that determines whether solutions output by each of a machine learning predictive model and an artificial intelligence predictive model are similar.

14. A non-transitory computer-readable medium storing instructions adapted to be executed by a computer processor to perform a method to facilitate data science model score management for an enterprise, the method comprising:

receiving, at a computer processor of a data science model score server from a user via a remote user device, an indication of a selected data science model;

retrieving, from a data science model score database, information about the selected data science model without retrieving information about other data science models, wherein the data science model score database contains encrypted electronic records, each encrypted record including a data science model identifier and a set of data science model scores generated for the enterprise;

based on the retrieved information, automatically calculating a maturity score for the selected data science model in accordance with a scalable score, a service-oriented score, a validated score, and a productized score along with associated scoring weights;

receiving from the remote user device an adjustment to at least one of the scalable score, the service-oriented score, the validated score, and the productized score;

responsive to the adjustment, automatically re-calculating the maturity score for the selected data science model;

providing evaluation feedback to a machine learning process so that scoring weights can be automatically improved;

transmitting data to the remote user device in support of a graphical interactive user interface including the maturity score along with a plurality of historical maturity scores and a reporting dashboard with a radar chart plotting current data science model values including: an automation rubric value, an execution rubric value, and a performance rubric value, wherein the plotted current data science model values plot a shape having an area and the area represents an overall maturity score for the current data science model; and automatically establishing communication links via an email server and a calendar application to provide data science model reports and alerts to the user.

\* \* \* \* \*